US012812432B2

(12) United States Patent
Vijayakumar et al.

(10) Patent No.: US 12,812,432 B2
(45) Date of Patent: Nov. 24, 2026

(54) CELLULAR FIELD TESTING AUTOMATION TOOL: PASS FAIL ANALYSIS AND TEST SCENARIO RECOVERY

(71) Applicant: Boost SubscriberCo L.L.C., Englewood, CO (US)

(72) Inventors: Nikhil Rangaraajan Vijayakumar, Littleton, CO (US); Andrew Allan, Littleton, CO (US); In-Kyung Kim, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 453 days.

(21) Appl. No.: 18/385,297

(22) Filed: Oct. 30, 2023

(65) Prior Publication Data

US 2025/0142383 A1 May 1, 2025

(51) Int. Cl.
*H04W 24/10* (2009.01)
*H04B 17/18* (2015.01)
*H04B 17/29* (2015.01)

(52) U.S. Cl.
CPC ............ *H04W 24/10* (2013.01); *H04B 17/18* (2015.01); *H04B 17/296* (2023.05)

(58) Field of Classification Search
CPC ...... H04W 24/10; H04B 17/18; H04B 17/296
USPC .......................................................... 370/329
See application file for complete search history.

(56) References Cited

U.S. PATENT DOCUMENTS 11,076,346 B2 7/2021 Chinbe et al.
11,765,789 B1 9/2023 Zheng
12,363,566 B2 7/2025 Naseef
2005/0272445 A1 12/2005 Zellner
2012/0035904 A1 2/2012 Seckendorf et al.
2014/0105058 A1 4/2014 Hu et al.
2014/0187172 A1 7/2014 Partee
2014/0280904 A1 9/2014 Bugenhagen
2015/0140956 A1 5/2015 Prewitt et al.
2015/0189525 A1* 7/2015 Schmidt ................ H04W 24/08 455/436
2015/0264591 A1 9/2015 Baeder
(Continued)

FOREIGN PATENT DOCUMENTS

CN 102595435 B * 8/2015

OTHER PUBLICATIONS

Nikhil Rangaraajan Vijayakumar et al., "Cellular Field Testing Automation Tool," U.S. Appl. No. 18/228,848, filed Aug. 1, 2023. (38 Pages).

(Continued)

*Primary Examiner* — Faisal Choudhury
(74) *Attorney, Agent, or Firm* — Kipman T. Werking; Frontier IP Law PLLC

(57) ABSTRACT

A disclosed method may include (i) initiating a cellular field testing tool that tests a condition of cellular network connectivity of a device under test, (ii) collecting logs of raw data from the cellular field testing tool based on the cellular field testing tool testing the condition of cellular network connectivity of the device under test, and (iii) applying autonomously, by the cellular field testing tool, an intelligent testing policy for a specific network condition test to the logs of raw data to output a binary decision of whether the specific network condition test passed or failed. Related systems and computer-readable mediums are further disclosed.

12 Claims, 21 Drawing Sheets

(56) References Cited

U.S. PATENT DOCUMENTS

| | | | |
|---|---|---|---|
| 2016/0227423 | A1 | 8/2016 | Bahr |
| 2016/0277939 | A1 | 9/2016 | Bertrand et al. |
| 2016/0373944 | A1 | 12/2016 | Jain et al. |
| 2017/0195357 | A1 * | 7/2017 | Sundhar ................ H04W 24/06 |
| 2017/0214734 | A1 | 7/2017 | Sun |
| 2017/0317907 | A1 | 11/2017 | Chinbe et al. |
| 2018/0084380 | A1 | 3/2018 | Lucas |
| 2019/0215707 | A1 | 7/2019 | Jackson |
| 2019/0377027 | A1 * | 12/2019 | Rivoir .............. G01R 31/31708 |
| 2021/0326680 | A1 | 10/2021 | Chaaraoui et al. |
| 2021/0385646 | A1 | 12/2021 | Liu et al. |
| 2022/0140919 | A1 | 5/2022 | Linkola |
| 2023/0370874 | A1 * | 11/2023 | Wu ........................ H04B 17/29 |
| 2023/0380012 | A1 | 11/2023 | Zheng |
| 2024/0187958 | A1 | 6/2024 | Yan et al. |
| 2024/0361469 | A1 | 10/2024 | Dupray et al. |

OTHER PUBLICATIONS

Nikhil Rangaraajan Vijayakumar et al., "Cellular Field Testing Automation Tool: Automation of Emergency Location Accuracy Improvements," U.S. Appl. No. 18/540,581, filed Dec. 14, 2023. (46 Pages).

Nikhil Rangaraajan Vijayakumar et al., "Cellular Field Testing Automation Tool Including Carrier Aggregation Combination Alignment," U.S. Appl. No. 18/535,795, filed Dec. 11, 2023. (47 Pages).

Nikhil Rangaraajan Vijayakumar et al., "Cellular Field Testing Automation Tool: Automated Communication Channel Handover," U.S. Appl. No. 18/395,237, filed Dec. 22, 2023. (52 Pages).

Nikhil Rangarajan Vijayakumar et al., "Cellular Field Testing Automation Tool Including Network Conditions Monitor, Audible and Visible Conclusion Alarms, and Data Stalls," U.S. Appl. No. 18/397,781, filed Dec 27, 2023. (60 Pages).

* cited by examiner

CELLULAR FIELD TESTING AUTOMATION TOOL: PASS FAIL ANALYSIS AND TEST SCENARIO RECOVERY

BRIEF SUMMARY

This disclosure is generally directed to a cellular field testing automation tool and improvements thereof. In one example, a method includes (i) initiating a cellular field testing tool that tests a condition of cellular network connectivity of a device under test, (ii) collecting logs of raw data from the cellular field testing tool based on the cellular field testing tool testing the condition of cellular network connectivity of the device under test, and (iii) applying autonomously, by the cellular field testing tool, an intelligent testing policy for a specific network condition test to the logs of raw data to output a binary decision of whether the specific network condition test passed or failed.

In some examples, the intelligent testing policy enhances a version of the cellular field testing tool that otherwise was limited to collecting raw data without analyzing that raw data.

In some examples, the raw data comprises an indication of a number of call drops or a number of call setup failures.

In some examples, outputting the binary decision of whether the specific network condition test passed or failed is based at least in part on the number of call drops or the number of call setup failures.

In some examples, the intelligent testing policy specifies criteria for determining whether the specific network condition test passed or failed.

In some examples, the criteria are provided by a cellular network carrier that uses the cellular field testing tool to test performance of a cellular service network that the cellular network carrier operates.

In some examples, the criteria specify that at least three failed runs of the specific network condition test result in the binary decision indicating that the specific network condition test failed.

In some examples, the criteria specify that two failed runs of the specific network condition test in combination with a successful run of the specific network condition test result in the binary decision indicating that the specific network condition test passed.

In some examples, a failure to satisfy preconditions for executing the specific network condition test results in the binary decision indicating that the specific network condition test failed.

In one example, a computer-readable medium encodes instructions that, when executed by at least one physical processor of a computing device, cause the computing device to perform operations comprising (i) initiating a cellular field testing tool that tests a condition of cellular network connectivity of a device under test, (ii) collecting logs of raw data from the cellular field testing tool based on the cellular field testing tool testing the condition of cellular network connectivity of the device under test, and (iii) applying autonomously, by the cellular field testing tool, an intelligent testing policy for a specific network condition test to the logs of raw data to output a binary decision of whether the specific network condition test passed or failed.

Another method may include (i) initiating a cellular field testing tool that tests a condition of cellular network connectivity of a device under test, (ii) detecting an indication that an initial attempted execution of a specific network condition test has failed, and (iii) reattempting, by recovery logic in response to detecting the indication that the initial attempted execution of the specific network condition test has failed, the same specific network condition test.

In some examples, the method further includes outputting a binary decision of whether the specific network condition test passed or failed based on results of the initial attempted execution and the reattempting of the specific network condition test.

In some examples, the specific network condition test is scheduled to be performed prior to a second and distinct network condition test within a queue of network condition tests.

In some examples, reattempting, by recovery logic in response to detecting the indication that the initial attempted execution of the specific network condition test has failed, the same specific network condition test is performed rather than proceeding directly to the second and distinct network condition test within the queue of network condition tests.

In some examples, detecting the indication that the initial attempted execution of the specific network condition test has failed comprises detecting that an initial call executed by the cellular field testing tool dropped during a predetermined window of time assigned to the specific network condition test.

In some examples, detecting that the initial call executed by the cellular field testing tool dropped during the predetermined window of time triggers the cellular field testing tool to perform a second call.

In some examples, the cellular field testing tool performs the second call in an attempt to avoid dropping the call for the predetermined window of time.

In some examples, a successful execution of the second call for the predetermined window of time results in a binary decision that the specific network condition test passed.

In some examples, a failed execution of the second call for the predetermined window of time results in a binary decision that the specific network condition test failed.

In another example, a non-transitory computer-readable medium encodes instructions that, when executed by at least one physical processor of a computing device, cause the computing device to perform operations comprising (i) initiating a cellular field testing tool that tests a condition of cellular network connectivity of a device under test, (ii) detecting an indication that an initial attempted execution of a specific network condition test has failed, and (iii) reattempting, by recovery logic in response to detecting the indication that the initial attempted execution of the specific network condition test has failed, the same specific network condition test.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
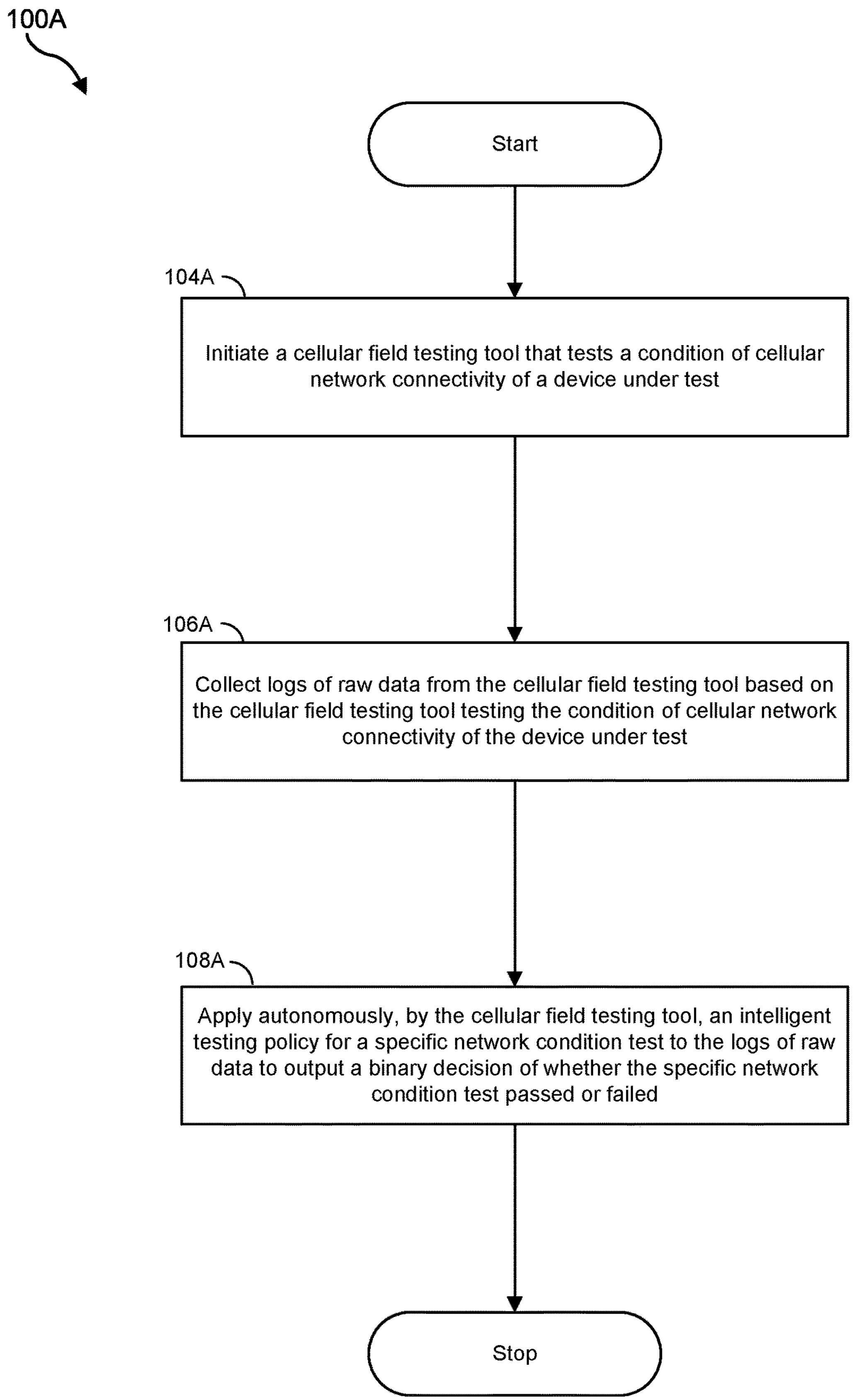
FIG. 1A shows a flow diagram for a method for a cellular field testing automation tool to perform pass fail analysis.

FIG. 1A shows a flow diagram for an example method 100A for operation of a cellular field testing tool. At step 104A, one or more of the systems described herein may initiate a cellular field testing tool that tests a condition of cellular network connectivity of a device under test. At step 106A, one or more of the systems described herein may collect logs of raw data from the cellular field testing tool based on the cellular field testing tool testing the condition of cellular network connectivity of the device under test. Lastly, at step 108A, one or more of the systems described herein may apply autonomously, as part of the cellular field testing tool, an intelligent testing policy for a specific network condition test to the logs of raw data to output a binary decision of whether the specific network condition test passed or failed.

As used herein, the term "logs of raw data" generally refers to passive measurement data output from a cellular field testing tool and/or radiofrequency drive testing tool. In general, these logs of raw data can be passive in the sense that the cellular field tool does not necessarily apply any evaluation or judgment onto these measurements (e.g., onto all, most all, or the predominant majority of such measurements), but rather leaves further evaluation, judgment, and/or commentary or analysis to the operator of the tool. As used herein, the term "intelligent testing policy" can simply refer to any policy that takes as input passive measurements from the cellular field testing tool and, by applying the policy, generates one or more evaluations, gradings, and/or judgments, etc., to thereby arrive at one or more conclusions regarding how good or bad one or more of the measurements are, as discussed in more detail below. In other words, the policy can be "intelligent" in the sense that it enhances passive measurement data with intelligence to analyze the degree to which the passively measured data is evaluated as desirable, good, appropriate, consistent with specifications, etc.

Figure 1B:
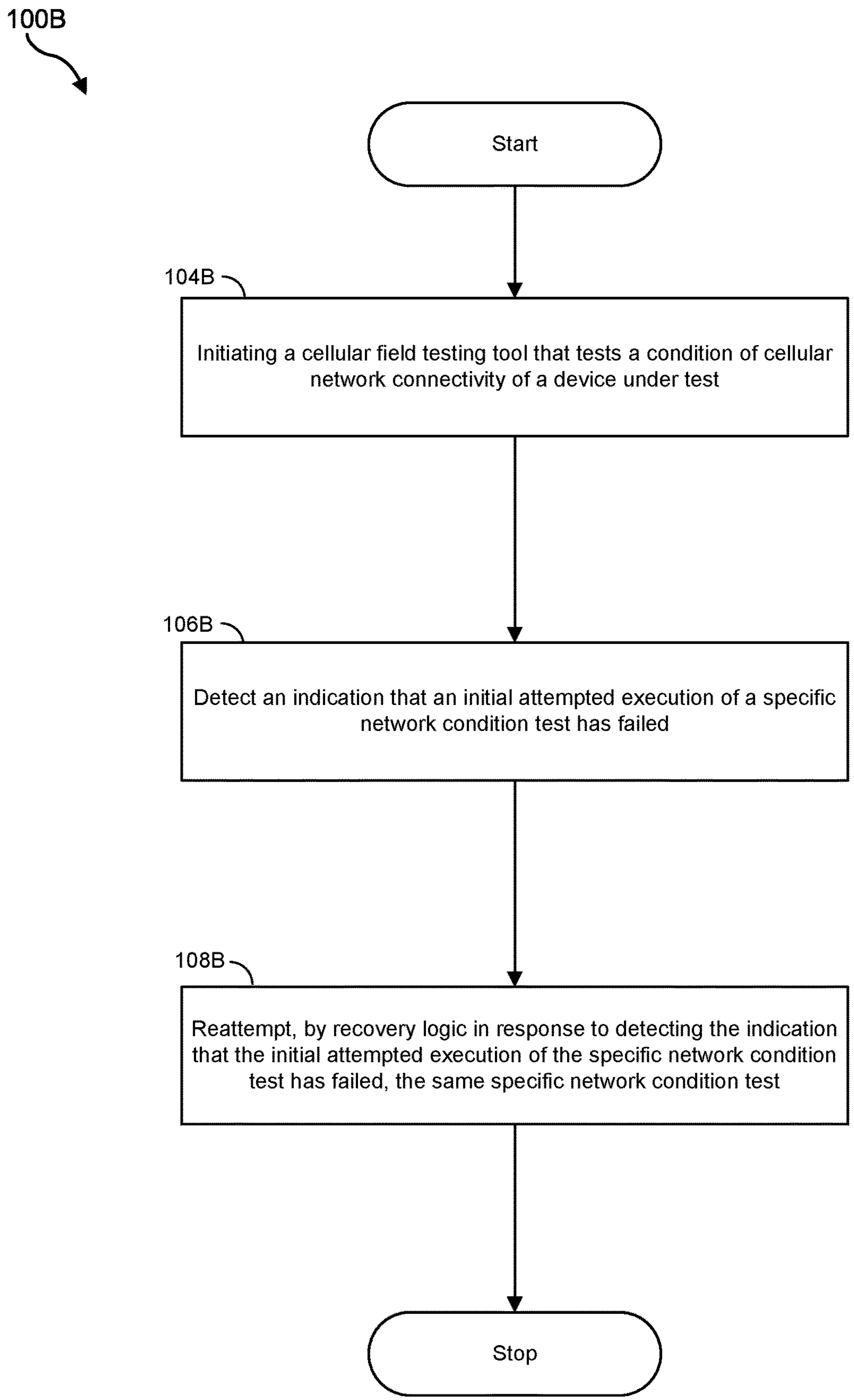
FIG. 1B shows a flow diagram for a method for a cellular field testing automation tool to perform test scenario recovery.

FIG. 1B shows a flow diagram for an example method 100B for operation of a cellular field testing tool. At step 104B, one or more of the systems described herein may initiate a cellular field testing tool that tests a condition of cellular network connectivity of a device under test. As step 106B, one or more of the systems described herein may detect an indication that an initial attempted execution of a specific network condition test has failed. Lastly, at step 108B, one or more of the systems described herein may reattempt, as part of recovery logic and in response to detecting the indication that the initial execution of the specific network condition test has failed, the same specific network condition test.

As used herein, the term "cellular field testing tool" generally refers to a tool that helps to test, when a device under test is connected to a cellular base station and/or a cellular network, one or more attributes of performance and/or cellular network connectivity provided to the device under test. In other words, the cellular field testing tool generally tests how well the device under test performs (or how well the network performs) when connected, and configured, in accordance with a particular configuration at a particular location. Cellular network carriers may be requested to, or required to, satisfy one or more specifications when smartphones and/or other items of user equipment are connected to cellular networks. To help ensure that the cellular network carriers satisfy these particular specifications, the cellular field testing tool can be used to connect to a device under test and then check or verify that the device under test is actually achieving cellular network connectivity that satisfies one or more corresponding performance metrics, which may include dozens or even hundreds of such performance metrics. In some examples, a cellular field testing tool may correspond to (or include) a radio frequency drive testing tool, as that term is used by those having skill in the art.

Despite the above, some cellular field testing tools can suffer from one or more deficiencies or sub-optimizations and these tools may, therefore, benefit from one or more improvements, including improvements that automate one or more procedures that assist a user with operating the tool. These improved cellular field testing tools can, therefore, enable employees, contractors, and/or administrators of the cellular network carriers to appropriately operate these tools even if the administrators lack a degree of experience, sophistication, and/or detailed education regarding the performance and operation of the tools. In other words, automated improvements for the cellular field testing tools can enable less sophisticated operators to operate the tools in a more streamlined and/or user-friendly manner. Consequently, these improvements can furthermore reduce a burden on the carriers of training and/or educating these operators, while further increasing a potential pool of candidate operators for carrying out these testing procedures, as discussed in more detail below.

Similarly, as used herein, the term "precondition" can generally refer to one or more conditions that must be satisfied prior to the starting of a specific and corresponding cellular field testing tool test. Generally speaking, these preconditions refer to contextual preconditions that help to establish that the cellular field testing tool, when operating, will perform successfully and obtain results that are valid and useful (see the discussion of FIG. 3 below). Accordingly, the term "precondition," as used herein, generally does not refer to universal software preconditions that would generally apply even outside of the context of cellular field testing tools. For example, the term "precondition," as used herein, will generally not refer to a requirement to powering on the computing device executing the cellular field testing tool, in view of the fact that such a precondition would generally apply to all software even outside of the context of cellular field testing tools.

As used herein, the term "set" can generally refer to a collection of at least one precondition, unless indicated otherwise. Generally speaking, such cellular testing tools may benefit from checking or verifying a larger multitude of preconditions, as discussed in more detail below.

Figure 2:
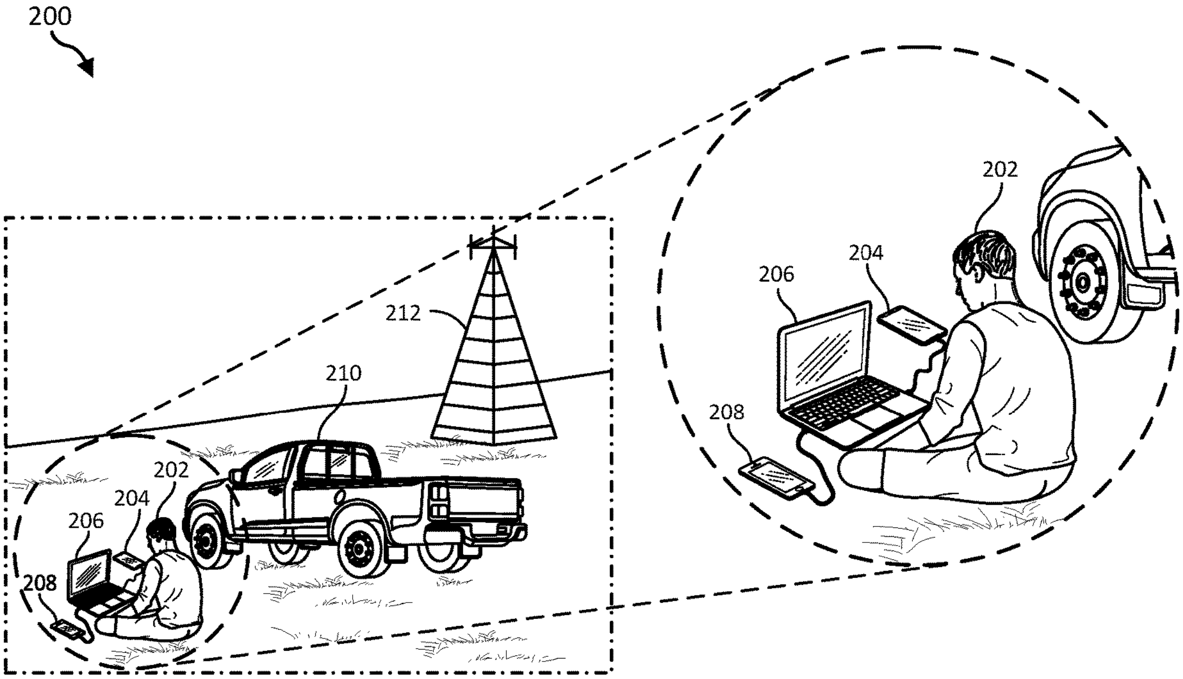
FIG. 2 shows a user operating a cellular field testing automation tool.

FIG. 2 shows an illustrative diagram 200 that helps to establish a context in which the methods described herein may be performed. As further shown in this diagram, a user or operator 202 may execute a cellular field testing tool on an item of user equipment or a computing device, such as a laptop 206. At the same time, the user may connect to additional computing devices and/or items of user equipment, such as a smartphone 204 and/or smartphone 208. In some examples, smartphone 204 may correspond to a device under test, where a smartphone 208 may correspond to a reference device (e.g., a device that may have been previously tested and/or verified as operating within specifications), or vice versa. For completeness, diagram 200 also illustrates how user 202 may have driven a truck 210 to a remote area at a particular location, where the user may establish cellular network connectivity with a cellular base station 212.

Figure 3:
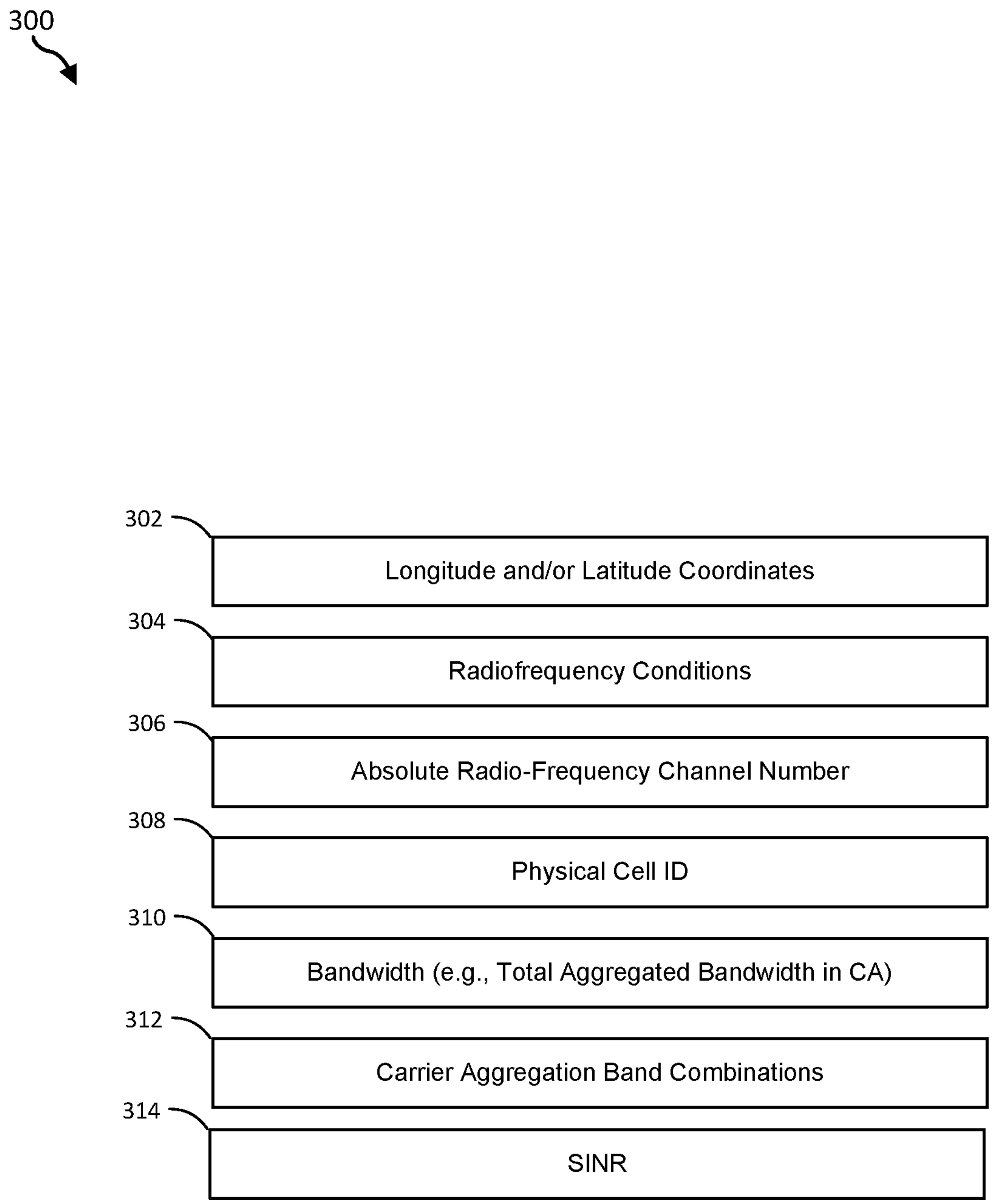
FIG. 3 shows example preconditions that can be checked prior to enabling a user to operate the cellular field testing automation tool.

FIG. 3 shows a helpful list 300 of illustrative examples of preconditions that can be checked. Precondition 302 includes longitude and/or latitude coordinates. For example, this may involve verifying that the device under test and/or the reference device (which can generally be co-located as shown in FIG. 2) are sufficiently close to, or located within, particular geolocation coordinates or perimeters. Precondition 304 includes radiofrequency conditions. Illustrative examples of such aerial frequency conditions may include one or more of the following values or measurements: Reference Signal Received Power (RSRP), Reference Signal Received Quality (RSRQ), and/or Signal to Interference plus Noise Ratio (SINR). Other illustrative examples of radio frequency conditions, which may be more or less applicable or relevant, in various embodiments, than those listed above, may further include Received Signal Strength Indicator (RSSI), Signal to Noise plus Interference Ratio (SNIR), Signal to Noise Ratio (SNR), Arbitrary Strength Unit (ASU), and/or Signal to Noise Ratio (RS SINR or RSSNR).

Returning to FIG. 3, precondition 306 may include an Absolute Radio-Frequency Channel Number (ARFCN). This particular value may refer to a unique number given to each radio channel in a Global System for Mobile Communications (GSM) cellular network. Precondition 308 may refer to a physical cell ID. As illustrated in FIG. 2, the device under test and/or the reference device may be connected to a computing device, such as a laptop, that executes the cellular field testing tool. These connections may be wired or wireless, and wired connections may be formatted to conform with the PCI protocol, USB protocol, BlueTooth, etc. Helping to ensure proper connections to the computing device that is executing the cellular field testing tool helps to ensure that, when the tool executes a specific test, the corresponding connection with the device under test and/or reference device is appropriately established to successfully interface with the logging tool to collect upload and download packets sent and received from the device under test and/or the reference device. Precondition 310 may refer to the total, aggregated bandwidth of both the device under test and the reference device, if carrier aggregation (CA) is applicable, to ensure that the device under test and the reference device are conducted under the same network conditions. Lastly, precondition 312 can refer to carrier aggregation cell combinations. As understood by those having skill in the art, some cellular network carriers can aggregate portions of spectrum and/or their cellular networks (e.g., for roaming purposes, etc.). Precondition 312 may help to check and verify that both the device under test and the reference device have the same band configurations aggregated prior to the beginning of performing one or more specific tests by the cellular field testing tool. Precondition 314 can refer to Signal to Interference and Noise Ratio (SINR).

Figure 4:
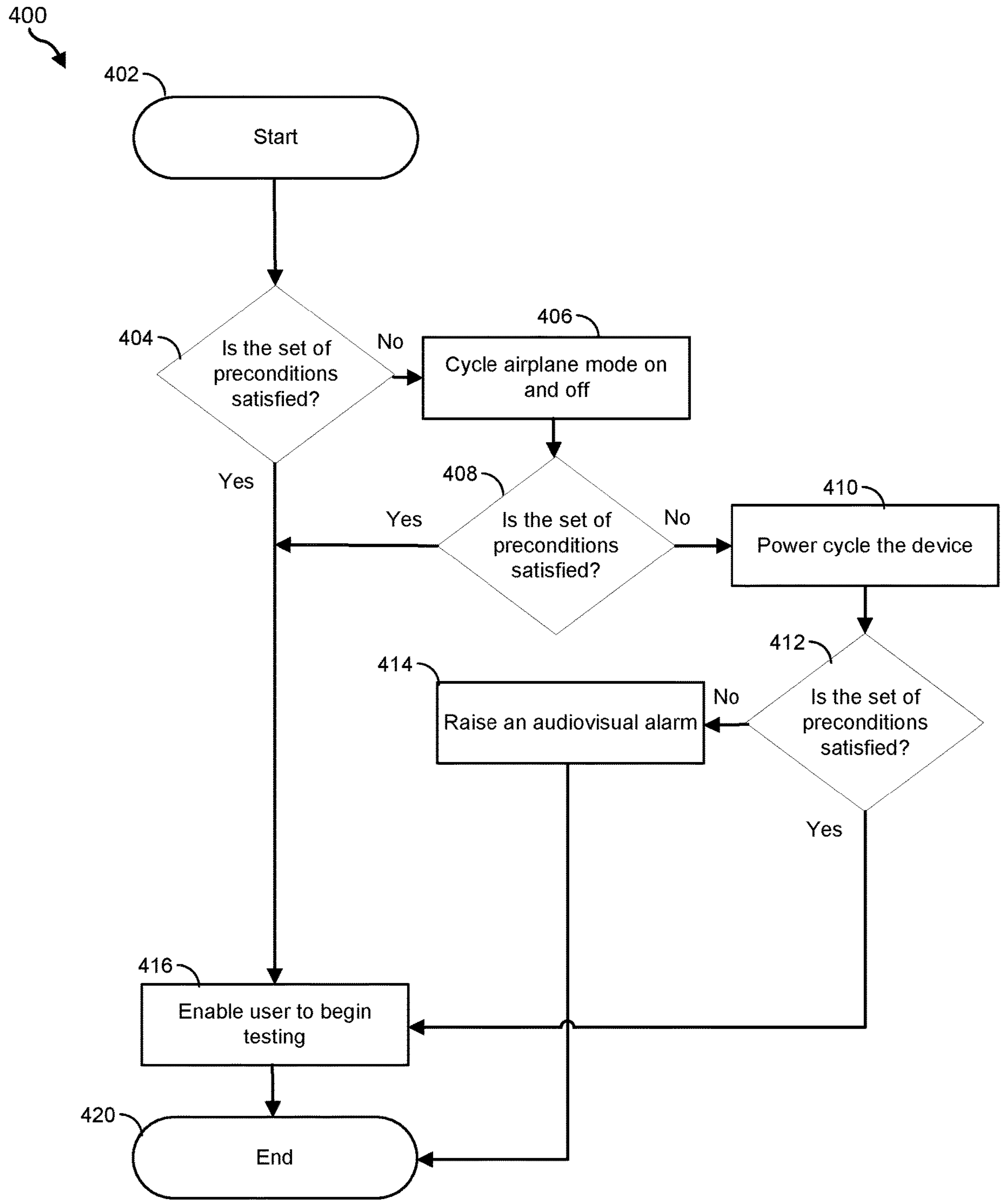
FIG. 4 shows another flow diagram for a method performed by a cellular field testing automation tool.

FIG. 4 shows a flow diagram for an example method 400 relating to operation of the cellular field testing tool. Method 400 helps to illustrate how, when checking for whether preconditions are satisfied, embodiments described herein may perform a series of different remedial actions in response to detecting that the preconditions are actually not satisfied. In some examples, the series of remedial actions may be increasingly staggered in terms of seriousness or severity, as discussed further below. The example of method 400 includes a series of three separate and staggered remedial actions (see step 406, step 410, and step 414). Although this example focuses on a set of three remedial actions, any suitable number or arbitrary number of remedial actions may be performed, in a parallel manner, as understood by those having skill in the art, with the goal of eventually achieving the successful satisfaction of all the preconditions. Moreover, although this example focuses on checking the exact same set of preconditions at each stage of the staggered process, in other examples the exact number or identity of the members of the set of preconditions may vary, slightly or more than slightly, between the different stages of the staggered process.

At step 402, method 400 may begin. At decision step 404, method 400 may perform a first check of whether the set of preconditions is satisfied. If the answer is yes at decision step 404, then method 400 may proceed to step 416, at which point method 400 may enable the user to begin a specific test, as discussed in more detail below. Alternatively, if the answer is no at decision step 404, then method 400 may proceed to step 406, at which point method 400 may cycle airplane mode on and off the specific device that is failing the preconditions (e.g., the device under test and/or the reference device).

From step 406, method 400 may proceed to decision step 408, which may correspond to the second stage of a staggered series of stages of testing whether the overall set of preconditions has been satisfied. In particular, at decision step 408, method 400 may check for the second time whether the set of preconditions has been satisfied. If the answer is no at decision step 408, then method 400 may proceed to step 410, at which point method 400 may power cycle the device that is failing the preconditions. Alternatively, again, if the answer is yes at decision step 408, then method 400 may proceed to step 416, at which point method 400 may enable the user to begin a specific test.

Lastly, as a third stage of method 400, at decision step 412, method 400 may again check whether the set of preconditions has been satisfied. If the answer is yes at decision step 412, then method 400 may proceed to step 416 again, at which point method 400 may enable the user to begin a specific test. Alternatively, if the answer is no at decision step 412, then method 400 may proceed to step 414, at which point method 400 may raise an audio and/or visual alarm to the user (see also the discussion of FIG. 14 below). At step 420, method 400 may conclude.

Figure 5:
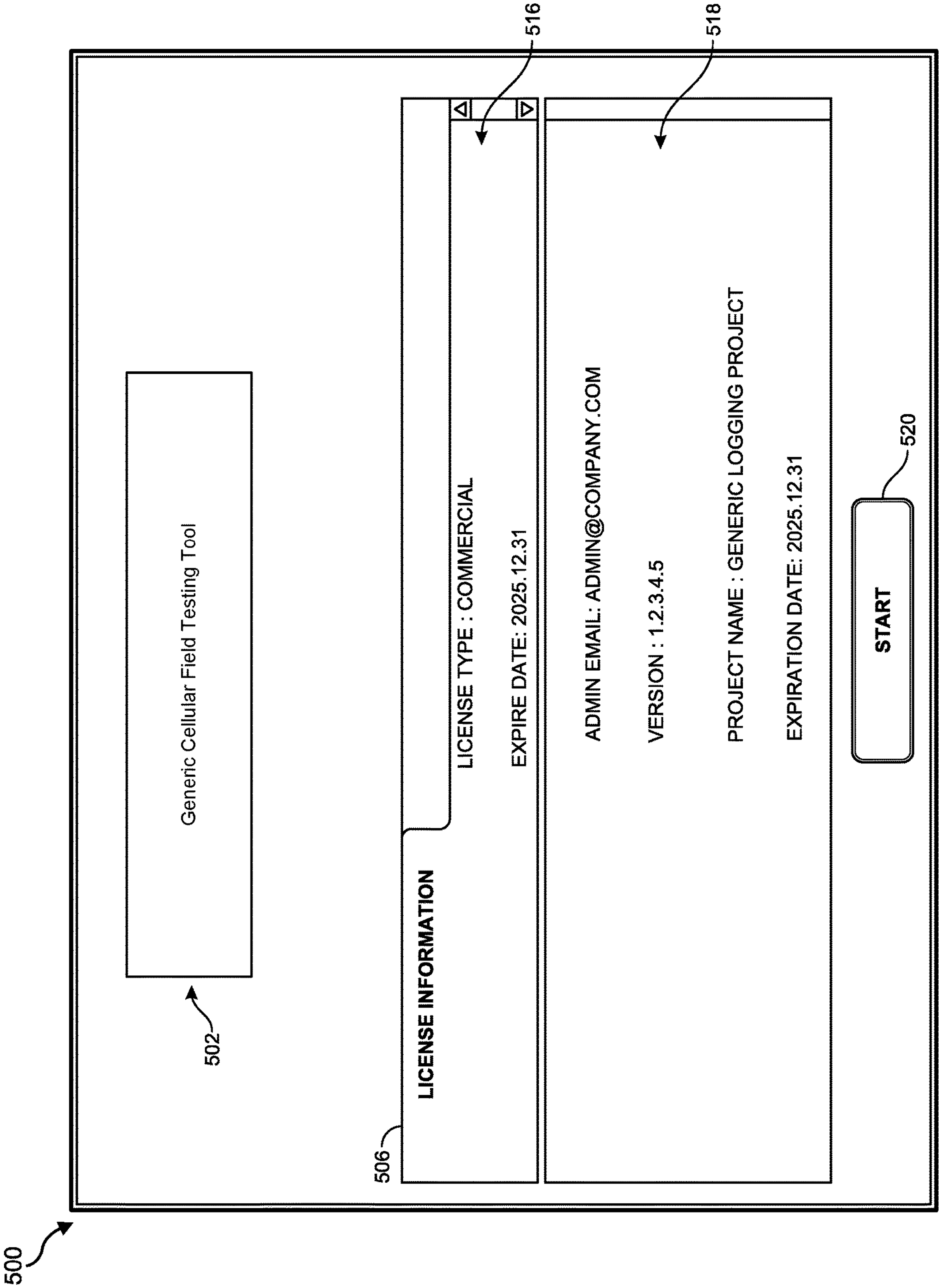
FIG. 5 shows an example introductory screen of a graphical user interface of the cellular field testing automation tool.

FIG. 5 shows a diagram 500 for an introductory screen of a graphical user interface for a cellular field testing tool that can be operated in accordance with method 400. As further shown in diagram 500, this introductory screen may include a headline 502 that indicates the name of the particular cellular field testing tool and/or software development company providing such a tool. In the simplified example of this figure, headline 502 indicates a generic name of "Generic Cellular Field Testing Tool." A graphical user interface element 506 may indicate license information. A window 516 may further provide information about the corresponding license, including its type and/or expiration date. Below that, a window 518 may further provide information about contacting a corresponding cellular network carrier ("company") that may be licensing and/or operating the corresponding software, as well as indications of a version of the software, a project name, and/or an expiration date of the license.

Figure 6:
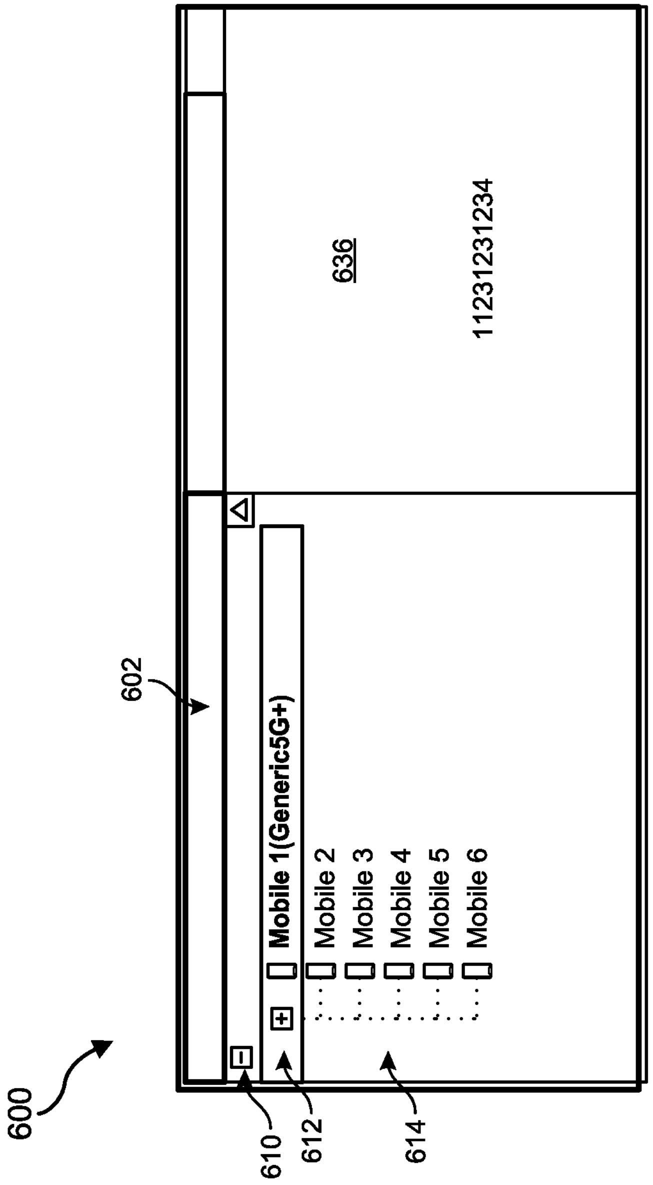
FIG. 6 shows an example screen of the graphical user interface of the cellular field testing automation tool.

FIG. 6 shows a diagram 600 of a screen of the same graphical user interface that may be presented as a result of selecting a button 520 (see FIG. 5) for starting execution of the corresponding cellular field testing tool. As further shown in diagram 600, the graphical user interface may include a devices list 602, and a drop-down menu 610 may indicate a list of mobile devices for testing. A graphical user interface element 612 may indicate the selection or connection of a specific mobile device ("Generic5G+" in this example). Moreover, a graphical user interface element 614 may further indicate a list of other candidate devices that may be selected or configured for testing. As further shown in this diagram, a portion 636 of diagram 600 indicates that the tool has connected to a particular phone number of the same mobile device corresponding to graphical user interface element 612.

Figure 7:
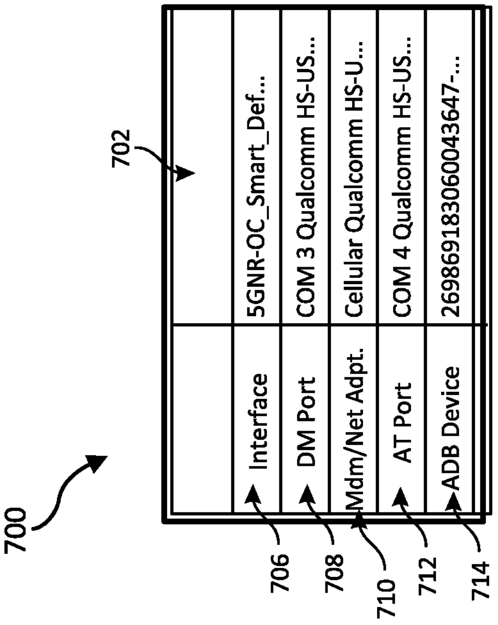
FIG. 7 shows an example screen of the graphical user interface of the cellular field testing automation tool.

FIG. 7 shows a diagram 700 of another screen of the same graphical user interface after the mobile device has been connected to initiate one or more specific tests. At this stage of operating the cellular field testing tool, the user or operator may toggle or configure one or more fields with values to set up specific testing procedures for each mobile device. Diagram 700 shows a portion 702 which corresponds to a connected mobile device of FIG. 6. A set of graphical user interface elements 706-714 show respective attributes or fields that the operator can toggle or configure to set up further testing procedures. In particular, as shown in this figure, the operator can configure, for each connected mobile device, an interface, a DM port (diagnostics and monitoring port), an MDM (Mobile Device Management) net adapter value, an AT port, and/or an Android Debug Bridge device value. In various examples, one or more of these values may be required to be configured to proceed with specific testing procedures. These examples of parameters that can be configured prior to beginning specific testing procedures are merely illustrative and, in other examples, additional or alternative parameters may be configured as appropriate.

Figure 8:
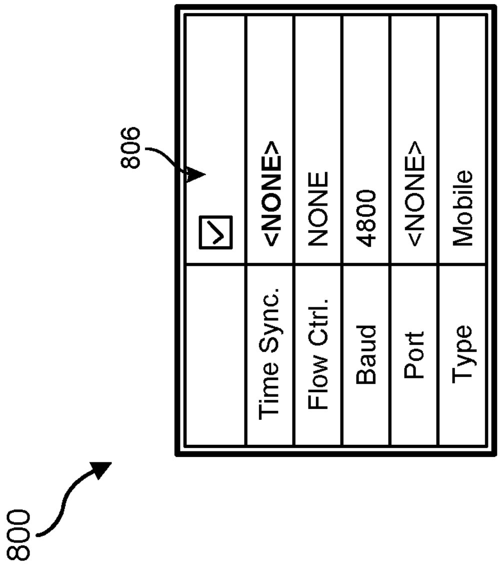
FIG. 8 shows an example screen of the graphical user interface of the cellular field testing automation tool.

FIG. 8 shows a diagram 800 that elaborates on a different aspect of the graphical user interface that was further shown as diagram 700. In particular, the corresponding diagram further illustrates how, prior to beginning specific testing procedures, the operator of the cellular field testing tool may toggle a Global Positioning System (GPS) field 806 to enable GPS functionality on one or more specific mobile devices that are under test.

Figure 9:
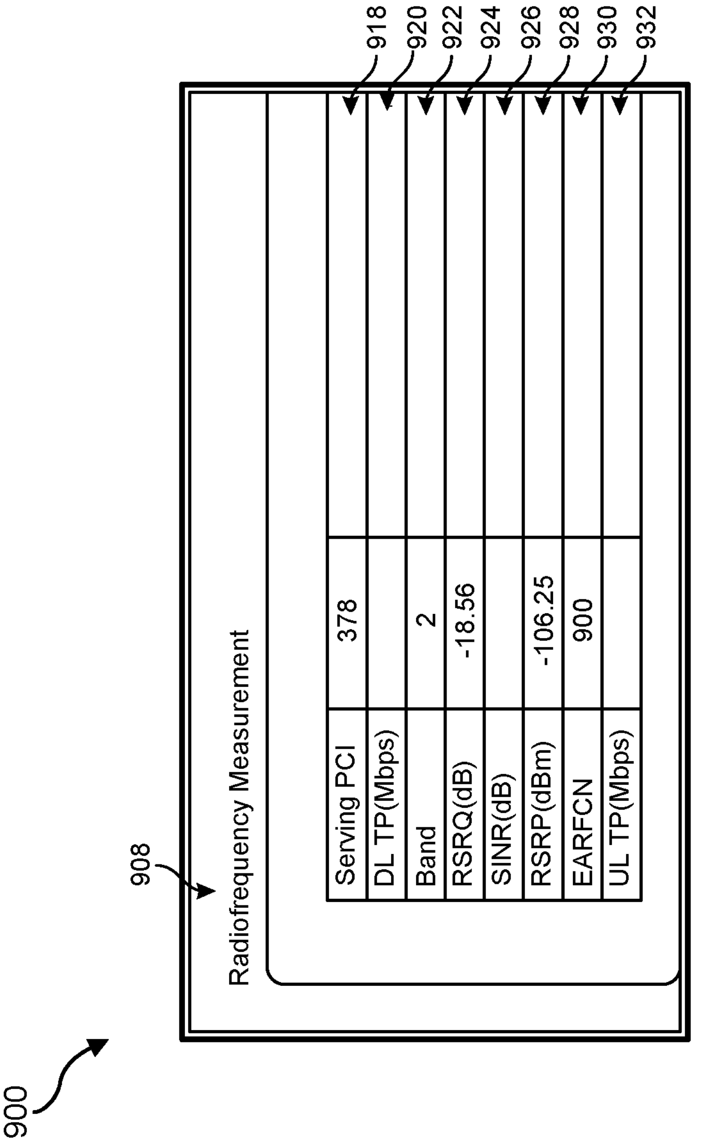
FIG. 9 shows an example screen of the graphical user interface of the cellular field testing automation tool.

FIG. 9 shows a diagram 900 of another screen of the graphical user interface of the cellular field testing tool. As further shown in this diagram, the graphical user interface can indicate to the operator one or more radiofrequency measurements and corresponding network connection attributes. A headline 908 may indicate "Radiofrequency Measurement." Rows 918-932 of diagram 900 may list respective measurement values relating to radiofrequency connectivity.

Figure 10:
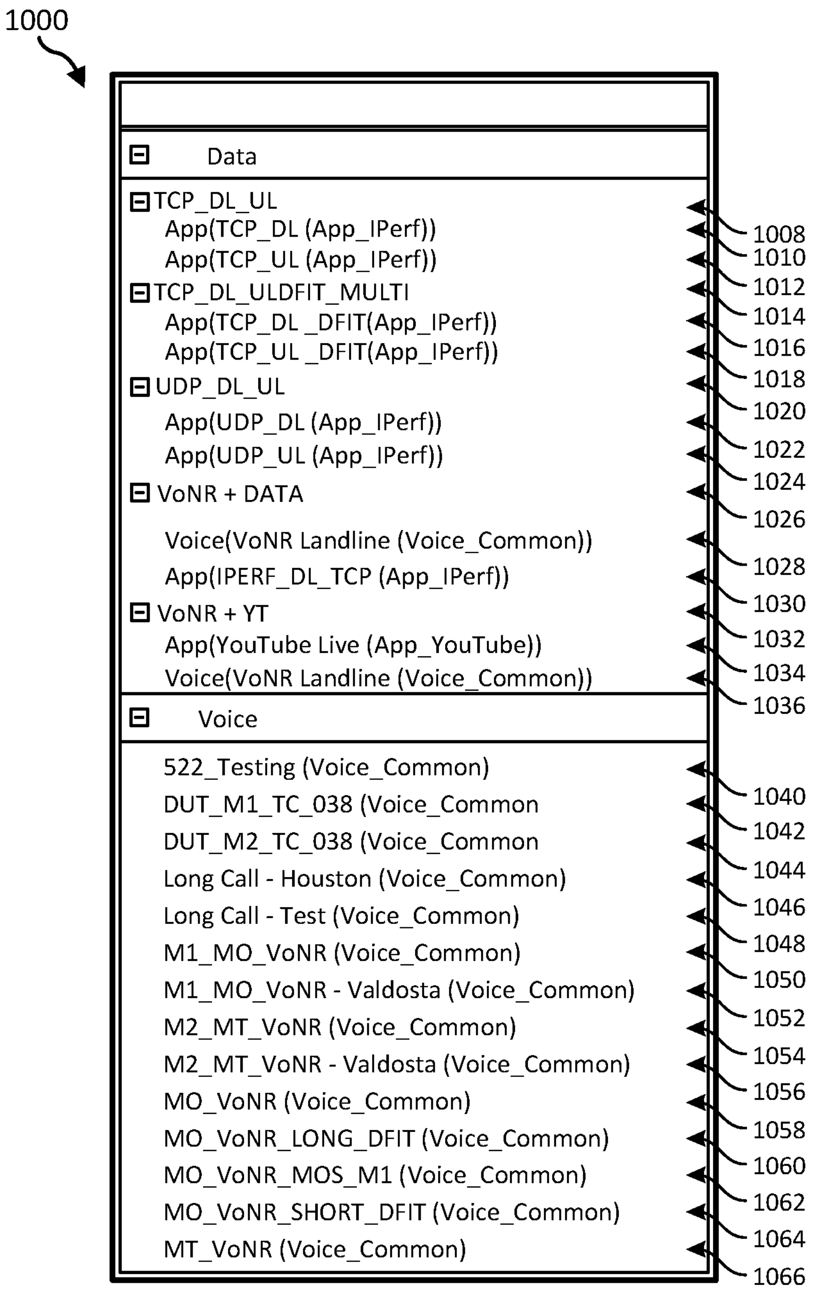
FIG. 10 shows an example screen of the graphical user interface of the cellular field testing automation tool.

FIG. 10 shows a diagram 1000 of another screen of the graphical user interface of the cellular field testing tool. As further shown in this figure, rows 1008-1066 may specify the names of different respective tests that the cellular field testing tool can perform, which can be user-customized, and these various specific tests may be categorized as either various different tests for testing data connections (see rows 1008-1036) and/or various different tests for testing voice connections (see rows 1040-1066).

Figure 11:
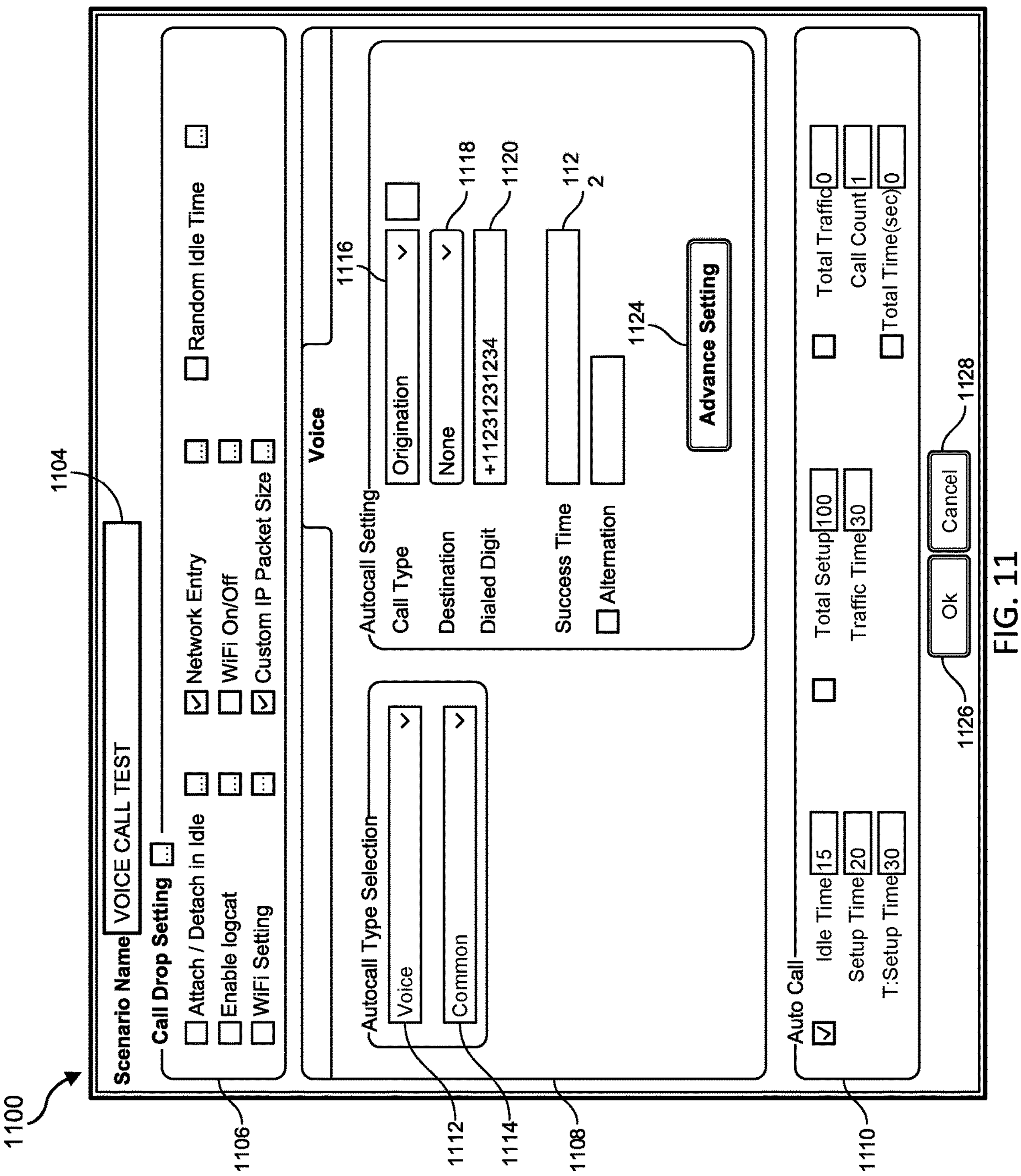
FIG. 11 shows an example screen of the graphical user interface of the cellular field testing automation tool.

FIG. 11 shows a diagram 1100 of another screen of the graphical user interface of the cellular field testing tool. As shown in this figure, diagram 1100 may include a scenario name 1104, as well as a panel 1106 of various fields or options that the operator can configure when setting up this particular test ("VOICE CALL TEST"). Another panel 1108 may further include a similar but distinct set of various fields or options that the operator can configure appropriately. Lastly, another panel 1114 may enable the user to further specify various values for another set of corresponding parameters as part of the configuration before initiating or executing the specific testing procedure. A button 1128 may enable the operator to cancel the current set of configuration procedures, and a button 1126 may enable the user to finalize configuration settings and proceed to the next stage of specific testing procedures.

Figure 12:
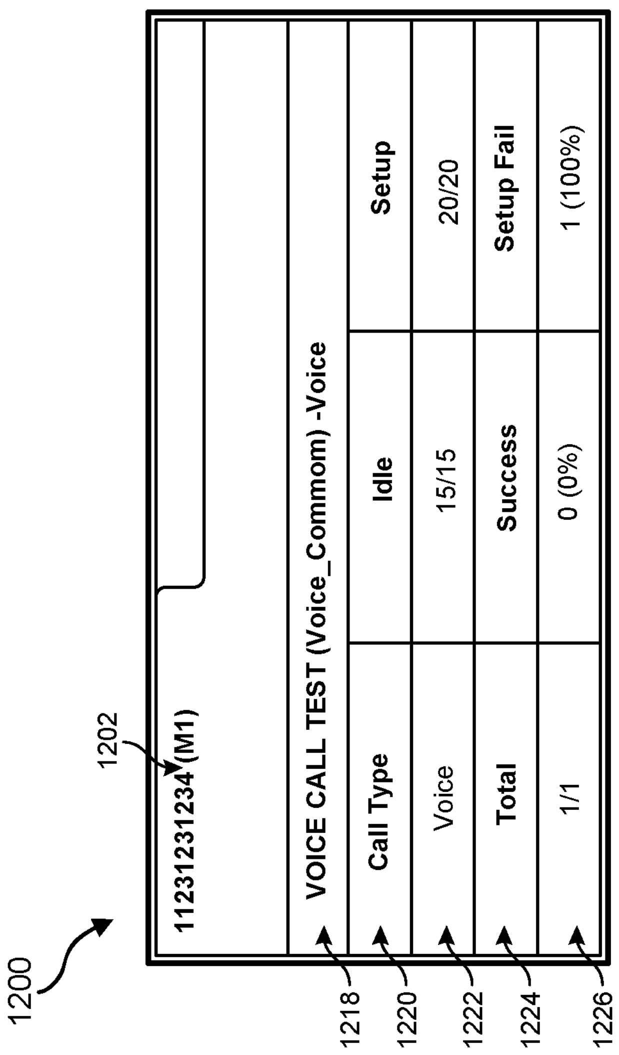
FIG. 12 shows an example screen of the graphical user interface of the cellular field testing automation tool.

FIG. 12 shows a diagram 1200 of another screen of the graphical user interface of the cellular field testing tool. An indicator 1202 may identify the phone number for the corresponding device under test. Generally speaking, the data displayed within the lower body of the window of diagram 1200 may display results, in real time, as one or more specific tests of the cellular field testing tool are being executed. In particular, a row 1220 and another respective row 1224 may display identifiers, within respective columns, to identify the type of resulting output information displayed in the rows that are immediately beneath these identifying rows. Thus, as further shown within diagram 1200, row 1222 may display values corresponding to the identifiers shown within row 1220, and row 1226 may display values corresponding to the identifier shown within row 1224. By way of illustrative example, row 1222 indicates that the call type (as indicated by row 1220) is "voice" within the same respective column.

Figure 13:
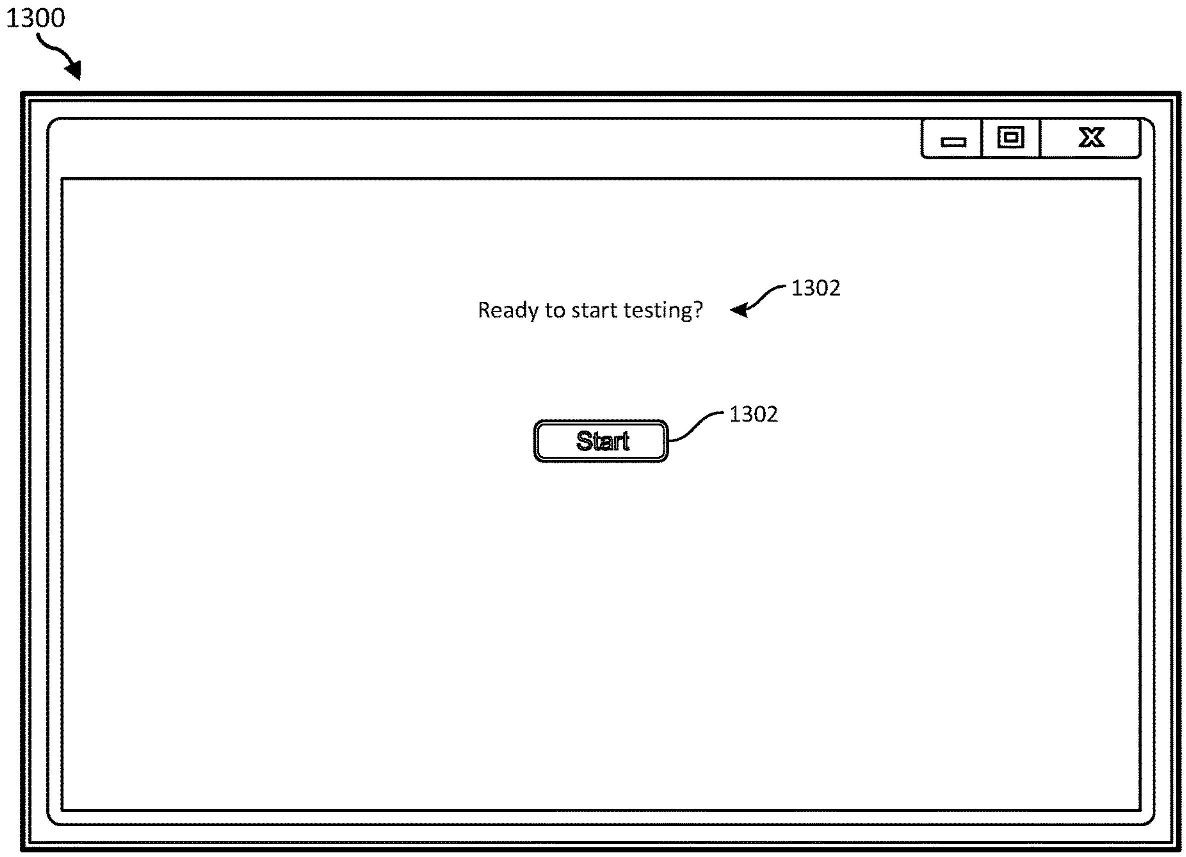
FIG. 13 shows an example screen of the graphical user interface of the cellular field testing automation tool.

FIG. 13 shows a diagram 1300 of a graphical user interface of the same cellular field testing tool that enables, or disables, the option for the operator to begin a specific test, including the specific tests that are identified or listed above by way of illustrative example. A prompt 1302 may inquire of the user whether the user is ready to begin testing procedures, after any one or more of the configuration and setup procedures that are outlined above have been performed, consistent with the discussion of FIGS. 5-12, for example. Graphical user interface element 1302, when this element is enabled, may allow the user to toggle the element and thereby finally begin specific testing procedures in accordance with the previous configuration and setup.

Nevertheless, as previously discussed above in connection with method 400, graphical user interface element 1302 and/or any suitable substitute for inputting information within the computing arts, may be disabled if the set of preconditions has not been satisfied. Thus, in various examples, graphical user interface element 1302 may be displayed in a "grayed out" manner such that, although the user can read a dimmer or grayer version of the "Start" text, attempting to toggle or select graphical user interface element 1302 may not result in any corresponding functionality. In other words, when not enabled, graphical user interface element 1302 may simply correspond to essentially frozen pixels that remain the same regardless of whether the user attempts to toggle them or not. Those having skill in the art will readily understand that any other suitable mechanism for disabling an input mechanism or graphical user interface button may be used to achieve essentially the same purpose of preventing the user from beginning a specific test procedure prior to the preconditions all being satisfied. Moreover, as soon as the preconditions are satisfied, perhaps after one or more stages of performing a series of remedial actions (see FIG. 4), graphical user interface element 1302 may be enabled such that the user can successfully toggle it to trigger the initiation of specific testing procedures.

As further discussed above, in some scenarios, even after performing a series of remedial actions (see the three remedial actions of FIG. 4), the set of preconditions may nevertheless remain unsatisfied. In that scenario, the computing device executing the cellular field testing tool may issue an alert to the user. In some related methodologies, there may be no such alert and/or the alert may be inconspicuous. Accordingly, this disclosure envisions alerts that are both conspicuous and audiovisual in nature such that the user receives both an audio alert as well as a visual alert, thereby clearly bringing this information to the attention of the user.

Figure 14:
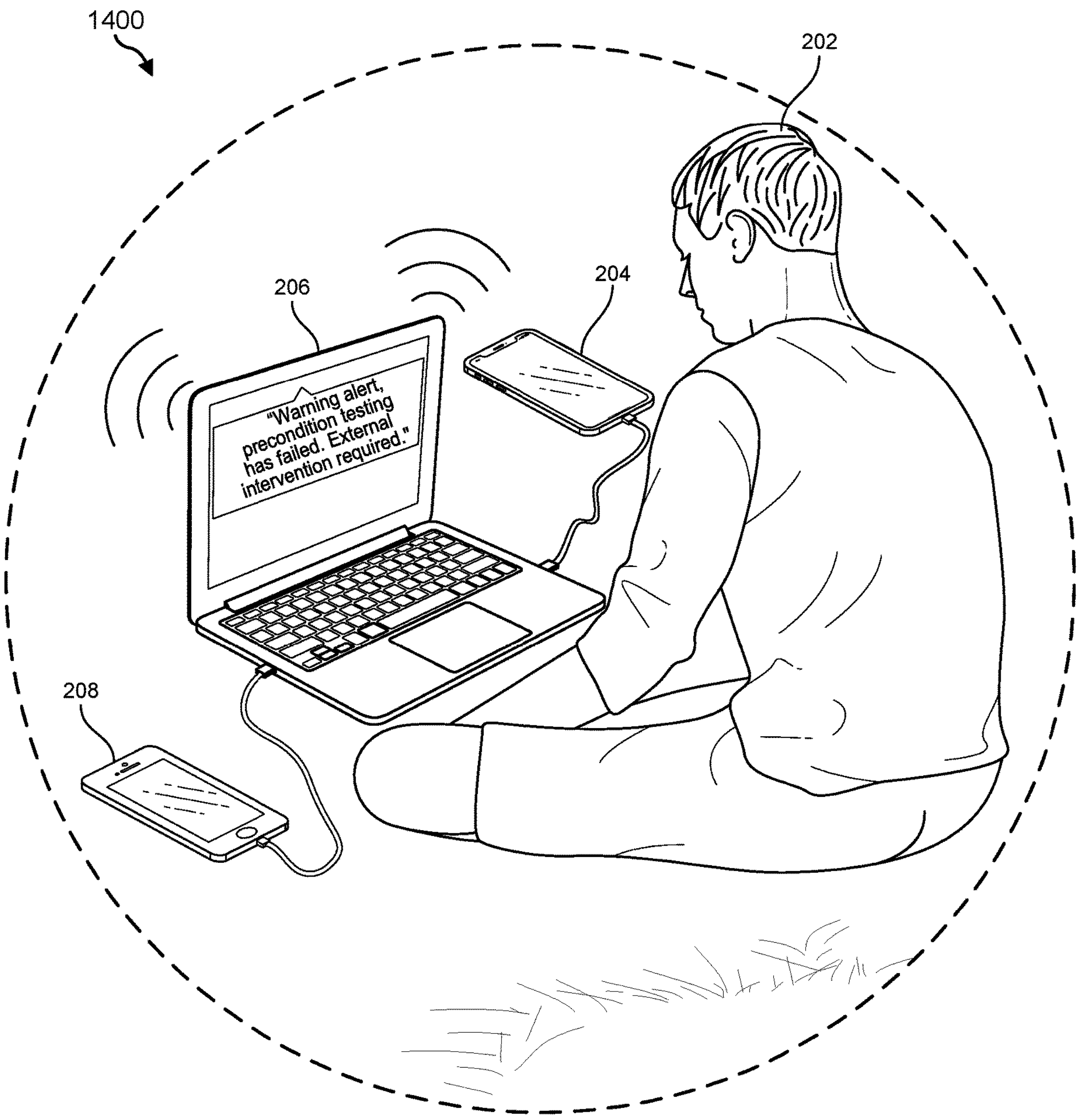
FIG. 14 shows a magnified view of the user operating the cellular field testing automation tool.

FIG. 14 shows a diagram 1400 of a magnified view of user 202 operating laptop 206 in connection with smartphone 204 and smartphone 208. As shown in this diagram, the visual alert may indicate to the user "Warning alert, precondition testing has failed. External intervention required." Those having skill in the art will readily ascertain that the particular text of this specific alert is merely an example for illustrative purposes and, in other examples, different variations and/or substitutes of such warnings may be used appropriately to notify the user.

Figure 15A:
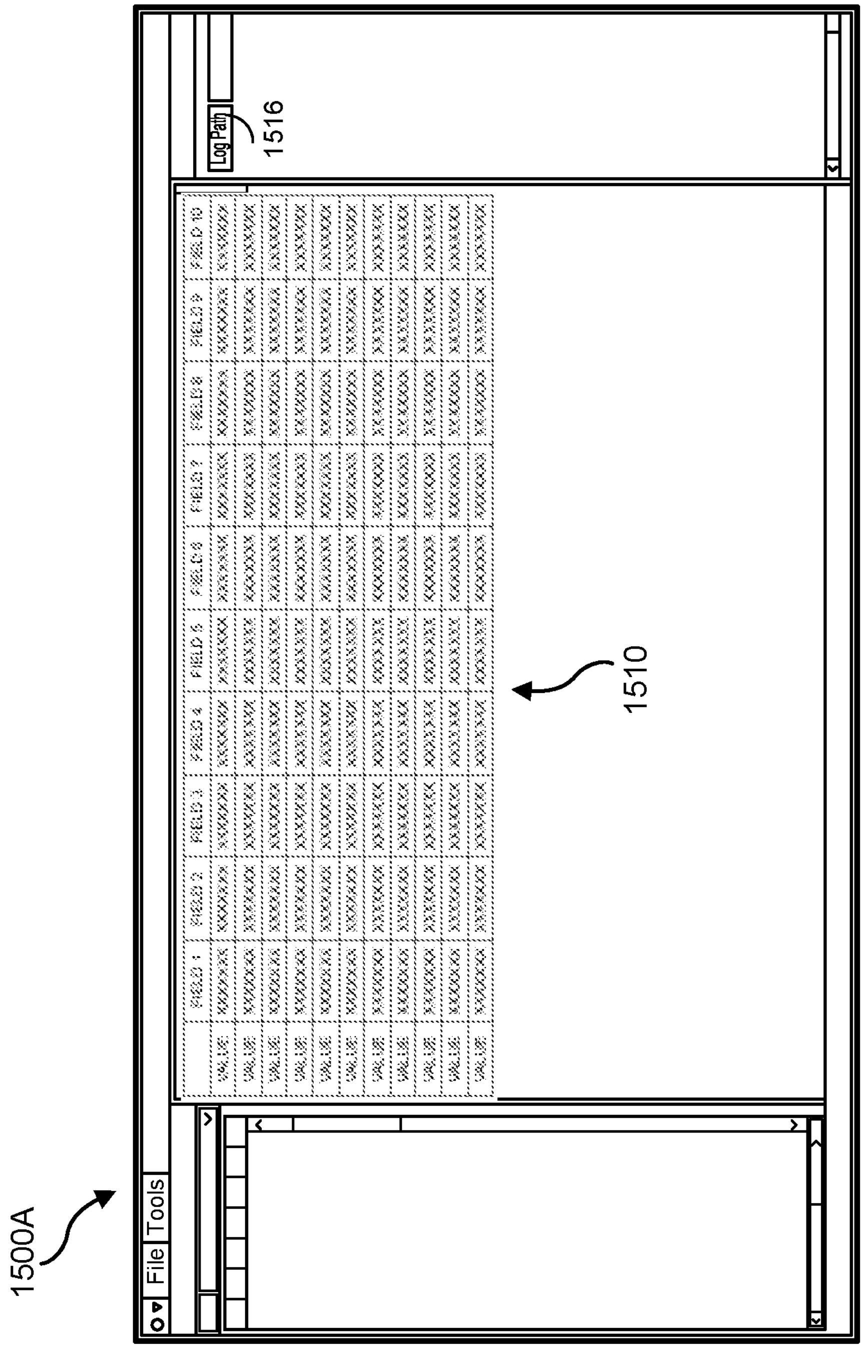
FIGS. 15A and 15B shows an example screen of a graphical user interface reporting raw log data.

Returning to the inventive concept reflected in the flow diagram of FIG. 1 for method 100A, which relates to intelligently automating and appropriately analyzing raw log data from a cellular field testing tool, FIG. 15A further shows a graphical user interface 1500A, which may further display raw log data 1510. Raw log data 1510 may correspond to log data stored within a raw log data file, as indicated by log path 1516, which can be configured, or specified within, graphical user interface 1500A. For simplicity and generality, FIG. 15A shows raw log data 1510 in the format of a set of columns indicating respective fields or attributes, as well as a set of rows indicating respective values corresponding to the same respective fields or attributes at appropriate intersections. These fields or attributes may correspond to any suitable field or attribute measured by a cellular field tool and/or radiofrequency drive test tool. Accordingly, these fields or attributes may correspond to any of the fields or attributes identified or measured consistent with the descriptions of FIGS. 2-14. Additionally, or alternatively, these fields or attributes may include, or relate to, any suitable permutation of one or more of signal levels, signal quality, interference, dropped calls, blocked calls, anomalous events, call statistics, service level statistics, quality of service information, handover information, neighboring cell information, and/or gps location coordinates. Similarly, these fields or attributes may include any secondary fields or attributes that provide contextual data with which to understand one or more of the attributes listed above, and/or metadata, including fields or attributes such as a time of measurement and/or a location, such as a geolocation, at which the measurement was performed. Illustrative examples of types of such cellular field testing tools and/or radiofrequency drive testing tools may include network benchmarking, optimization and troubleshooting, and/or service quality monitoring. In some examples, the cellular field testing tool may include related tools other than radiofrequency drive testing tools in accordance with the definitions set forth above consistent with the discussions of FIGS. 2-14.

Illustrative examples of log file format extensions may include one or more of .drm, .scn, .udm, .cal, .sc1, .sc2, .dlf, .sbs, .mbl, .fmt, .asc, .dtn, .fsn, .ftn, .cap, .pcap, .csv, .txt, .log, etc. Nevertheless, the mere use of such a file format extension does not necessarily indicate that the corresponding file constitutes one or more logs of raw data, as used in method 100A. Rather, the use of such a file extension with a file containing measurement output from a cellular field testing tool and/or radiofrequency drive testing tool, and consistent with the figures described herein, is a factor that can be indicative that the file constitutes a log of raw data.

In some examples, the intelligent testing policy of method 100A enhances a version of the cellular field testing tool that otherwise was limited to collecting raw data without analyzing that raw data. Generally speaking, the inventive concept reflected within method 100A may solve a problem relating to the fact that related cellular field testing tools and/or radiofrequency drive testing tools are generally passive collectors of measurement information. In other words, these tools generally collect a comprehensive multitude of different items of measurement information as part of their testing procedures and then report these items of measurement information without any significant or meaningful analysis, evaluation, judgment, and/or commentary. This shortcoming or deficiency thereby leaves the task of significant or meaningful analysis to one or more human users, which introduces a variety of different applications, deficiencies, and/or shortcomings, including human error, limited analysis speed, limited accuracy, limited precision, the cost of human labor, degrading performance over time, and/or the ability or tendency of such human analysts to become overwhelmed by the sheer quantity of measurement information. To help address one or more of the deficiencies or suboptimizations that are outlined above, method 100A reflects an inventive concept whereby intelligent automation may be enabled, consistent with FIG. 1 and FIG. 15B, for example, and as discussed in more detail below.

Figure 15B:
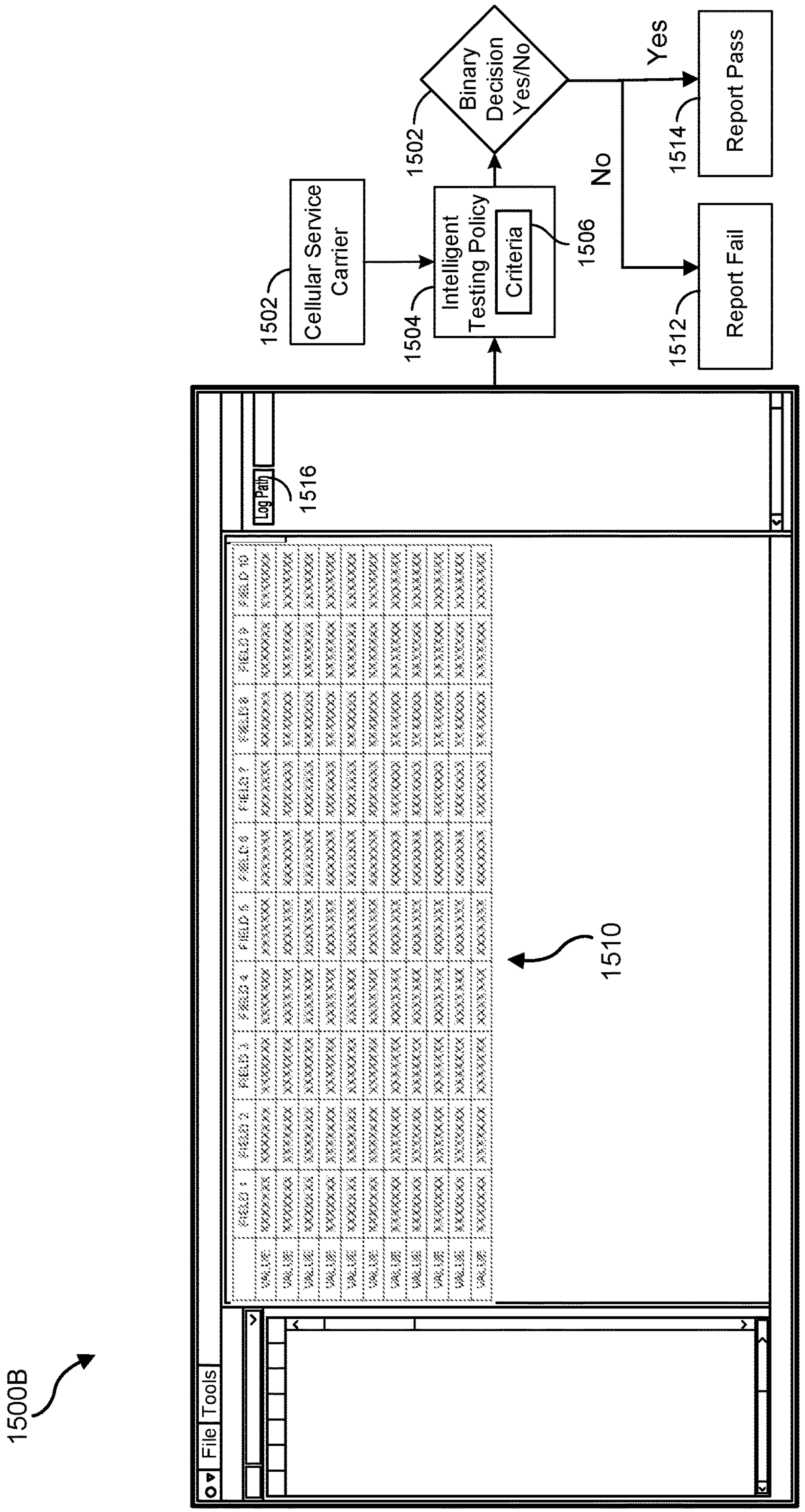

FIG. 15B shows a workflow 1500B corresponding to an enhanced version of the graphical user interface of FIG. 15A, which has been enhanced in accordance with method 100A. Accordingly, FIG. 15B illustrates how a cellular service carrier 1502 can supply criteria 1506 for an intelligent testing policy 1504, as further defined above, and intelligent testing policy 1504 can be applied to raw log data 1510 to thereby generate a binary decision, at a decision step 1502, of whether or not a specific network condition test corresponding to intelligent testing policy 1504 has passed or failed. If the specific network condition test has passed then this result can be reported at a step 1514. If the specific network condition test has failed, then this result can be reported at a step 1512, as shown. Moreover, this workflow or method can be performed in an autonomous, semiautonomous, and/or automated manner without any manual intervention or without significant manual intervention, thereby helping to address one or more of the deficiencies that are outlined above regarding certain related cellular field testing tools. Moreover, as further described below in connection with FIG. 18, multiple ones of these specific network condition tests can be configured in a queue to be performed in series automatically, thereby multiplying the automation benefits that are described above and further eliminating or reducing the burden upon one or more manual operators of the cellular field testing tool.

In some examples, the raw data may include an indication of a number of call drops or a number of call setup failures. Moreover, in these examples, outputting the binary decision of whether the specific network condition test passed or failed can be based at least in part on the number of call drops or the number of call setup failures.

Figure 16:
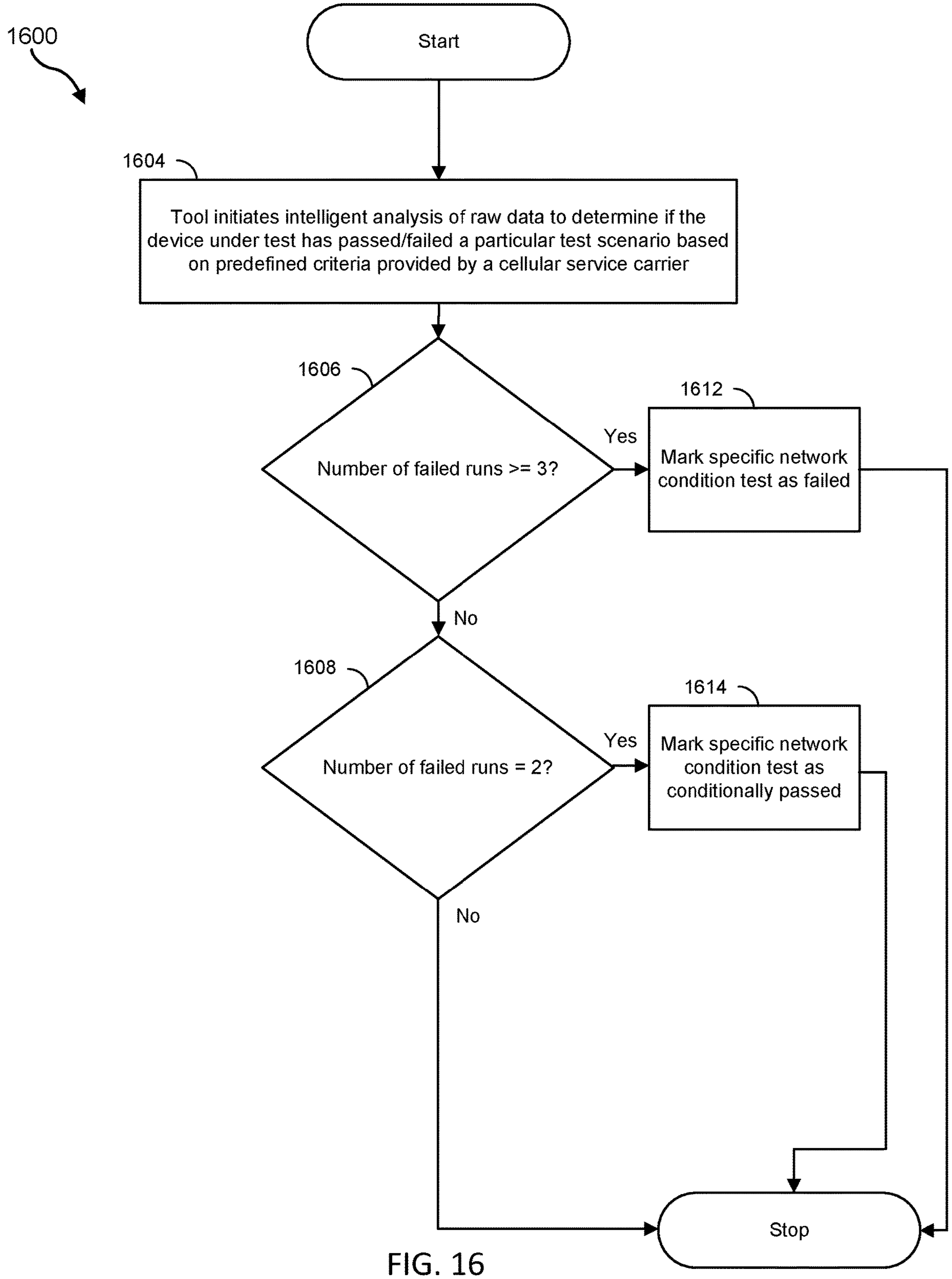
FIG. 16 shows a flow diagram for an example method for a cellular field testing automation tool to perform pass fail analysis.

FIG. 16 shows a flow diagram for an example method 1600 in which a number of "runs" or executions of the same specific network condition test can be performed and the number of successful or unsuccessful runs can be used to evaluate whether or not the overall specific network condition test has been considered to pass or fail. Generally speaking, as discussed above, an attempted execution of the specific network condition test can be considered to have failed due to a call drop or a call setup failure. At step 1604, the cellular field testing tool initiates intelligent analysis of raw data to determine if the device under test has passed or failed a particular test scenario based on predefined criteria, which can be provided by the cellular service carrier. At decision step 1606, a decision is made regarding whether a number of failed runs is greater than or equal to a first variable value, such as three. In other words, the criteria specify that at least three failed runs of the specific network condition test result in the binary decision indicating that the specific network condition test failed.

If the decision is yes at decision step 1606, then the specific network condition test can be marked as a failure at step 1612. Otherwise method 1600 can proceed to decision step 1608, at which point it can be evaluated whether a number of failed runs equals a second variable value, such as two. In other words, the criteria specify that two failed runs of the specific network condition test in combination with a successful run of the specific network condition test result in the binary decision indicating that the specific network condition test passed (e.g., conditionally passed). If the decision is yes at decision step 1608, then at step 1614 the specific network condition test can be marked as a conditional pass. As used herein, the term "conditional pass" can refer to a decision that a specific network condition test passed, while also being supplemented with one or more items of metadata indicating that the passing of the specific network condition test was performed in a conditional sense or context. Moreover, although FIG. 16 uses two different decision steps based on two different respective values as threshold or comparison values, the number of decision steps and/or the specific values used for threshold or comparison purposes are merely illustrative examples in this figure, and in other examples different numbers of decision steps and/or different values may be used as appropriate or suitable, as understood by those having skill in the art, and to achieve the technological solution reflected in FIGS. 1A-1B and FIG. 16.

Figure 17:
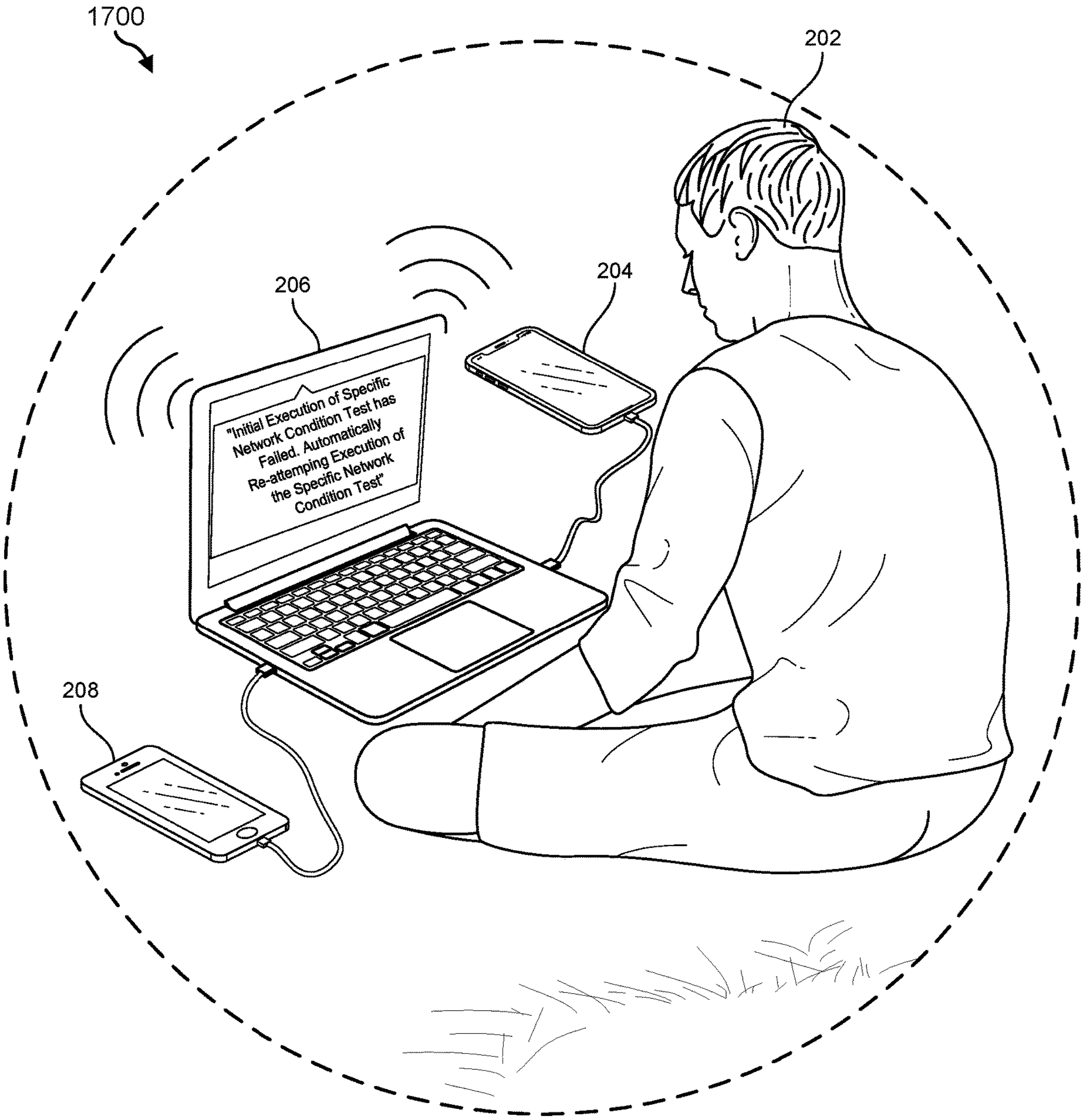
FIG. 17 shows a magnified view of the user operating the cellular field testing automation tool.

As further discussed above, method 100B may involve (i) initiating a cellular field testing tool that tests a condition of cellular network connectivity of a device under test, (ii) detecting an indication that an initial attempted execution of a specific network condition test has failed, and (iii) reattempting, by recovery logic in response to detecting the indication that the initial attempted execution of the specific network condition test has failed, the same specific network condition test. Consistent with method 100B, FIG. 17 shows a diagram 1700, which is similar to diagram 1400, but which shows user 202 receiving a different message on laptop 206, where this message states "initial execution of specific network condition test has failed" and "automatically re-attempting execution of the specific network condition test." Although it not necessary to output a graphical indication of such a message to the user of the laptop, this graphical indication can be helpful to the user to understand that the initial attempted execution has failed. Notably, adequately reflected throughout the specification and the discussion of method 100B, this application distinguishes between a failed attempted execution of a specific network condition test and overall failure of the specific network condition test, such that the substance of the specific network condition test can be attempted multiple times and failed multiple times, while nevertheless the overall passing or failure of the specific network condition test can be based on a total number of failed attempts and/or successful attempts, as discussed further below, and consistent with the figures.

Consistent with diagram 1700, the user of the laptop can also receive a binary decision of whether the specific network condition test passed or failed based on results of the initial attempted execution and the reattempting of the specific network condition test. For example, as shown in FIG. 16, two failed attempted executions of the specific network condition test, followed by, or in combination with, a successful attempted execution of the specific network condition test can result in an overall binary decision that the specific network condition test passed, including potentially with metadata indicating that the passing of the specific network condition test was marked as a conditional pass.

Figure 18:
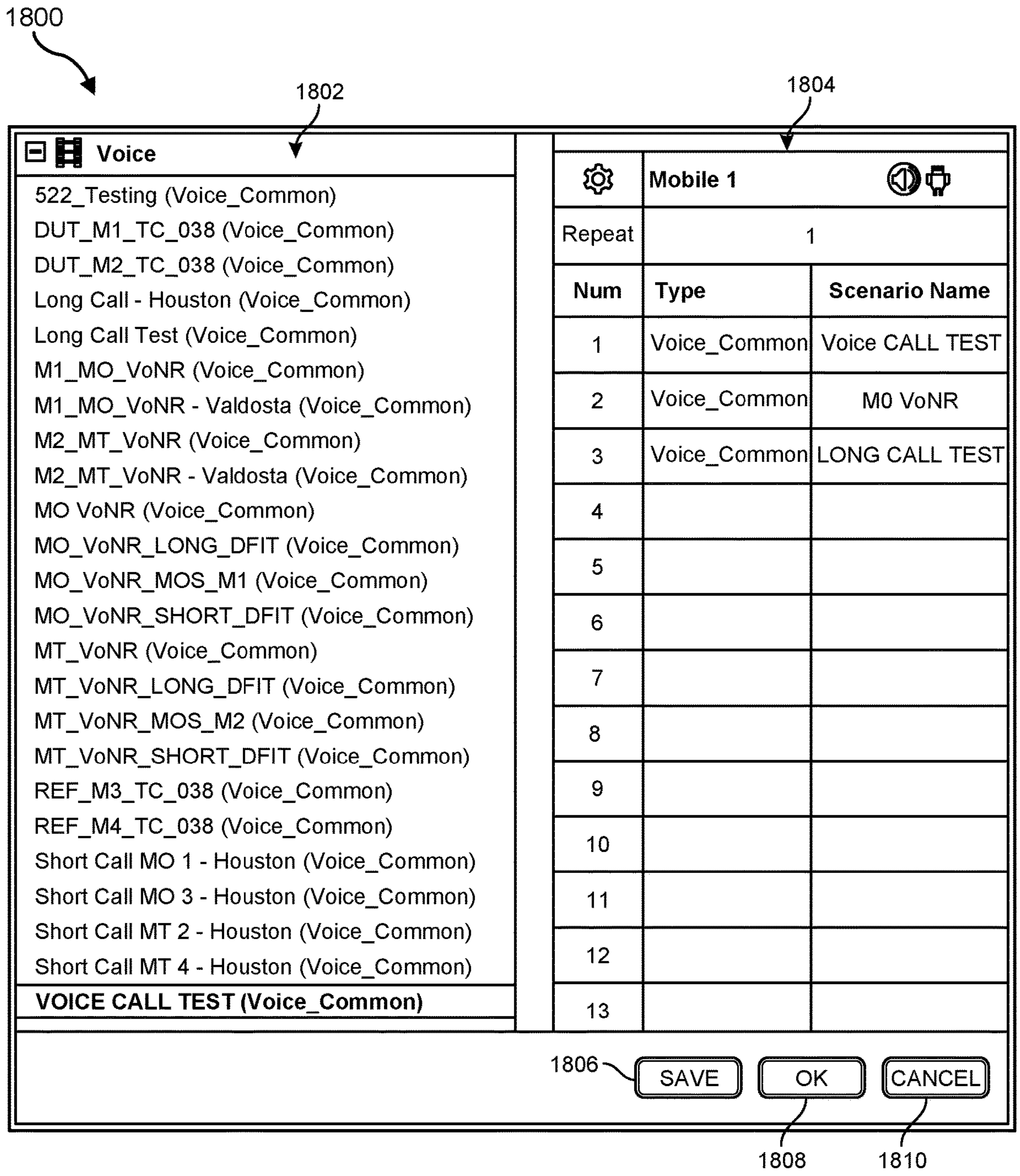
FIG. 18 shows an example screen of a graphical user interface of the cellular field testing automation tool displaying a queue of specific network condition tests.

In some examples, the specific network condition test is scheduled to be performed prior to a second and distinct network condition test within a queue of specific network condition tests. FIG. 18 shows an example diagram 1800 of a graphical user interface of the cellular field testing tool, including a portion 1802 that includes a comprehensive list of potential specific network condition tests, and a portion 1804, which shows a queue of specific network condition tests. As shown, a user can drag-and-drop, or otherwise input, to move or select one or more of the specific network condition tests into portion 1804. In the particular example of this diagram, three specific network condition tests have been dragged and dropped into portion 1804, as shown. Diagram 1800 may also further include a save button 1806, an ok button 1808, and a cancel button 1810, as shown.

In some examples, the specific network condition test is scheduled to be performed prior to a second and distinct network condition test within the queue of network condition tests. By way of illustrative example, as shown in diagram 1800, the specific network condition test "MO VoNR" is scheduled to be performed after the specific network condition test "Voice CALL TEST" and the specific network condition test "LONG CALL TEST" is scheduled to be performed after the specific network condition test "MO VoNR."

In some examples, reattempting, by recovery logic in response to detecting the indication that the initial attempted execution of the specific network condition test has failed, the same specific network condition test is performed rather than proceeding directly to the second and distinct network condition test within the queue of network condition tests. Thus, in the example of diagram 1800, if an initial attempted execution of one specific network condition test, such as voice CALL TEST, fails, then the recovery logic can reattempt execution of the same specific network condition test, rather than proceeding directly to the next specific network condition test within the queue (i.e., rather than proceeding to the specific network condition test named "MO VoNr").

In further examples, detecting the indication that the initial attempted execution of the specific network condition test has failed comprises detecting that an initial call executed by the cellular field testing tool dropped during a predetermined window of time assigned to the specific network condition test. In these examples, detecting that the initial call executed by the cellular field testing tool dropped during the predetermined window of time can trigger the cellular field testing tool to perform a second call. Moreover, in these examples, the cellular field testing tool can perform the second call in an attempt to avoid dropping the call for the predetermined window of time. A successful execution of the second call for the predetermined window of time can result in a binary decision that the specific network condition test passed, whereas a failed execution of the second call for the predetermined window of time can result in a binary decision that the specific network condition test failed.

Figure 19:
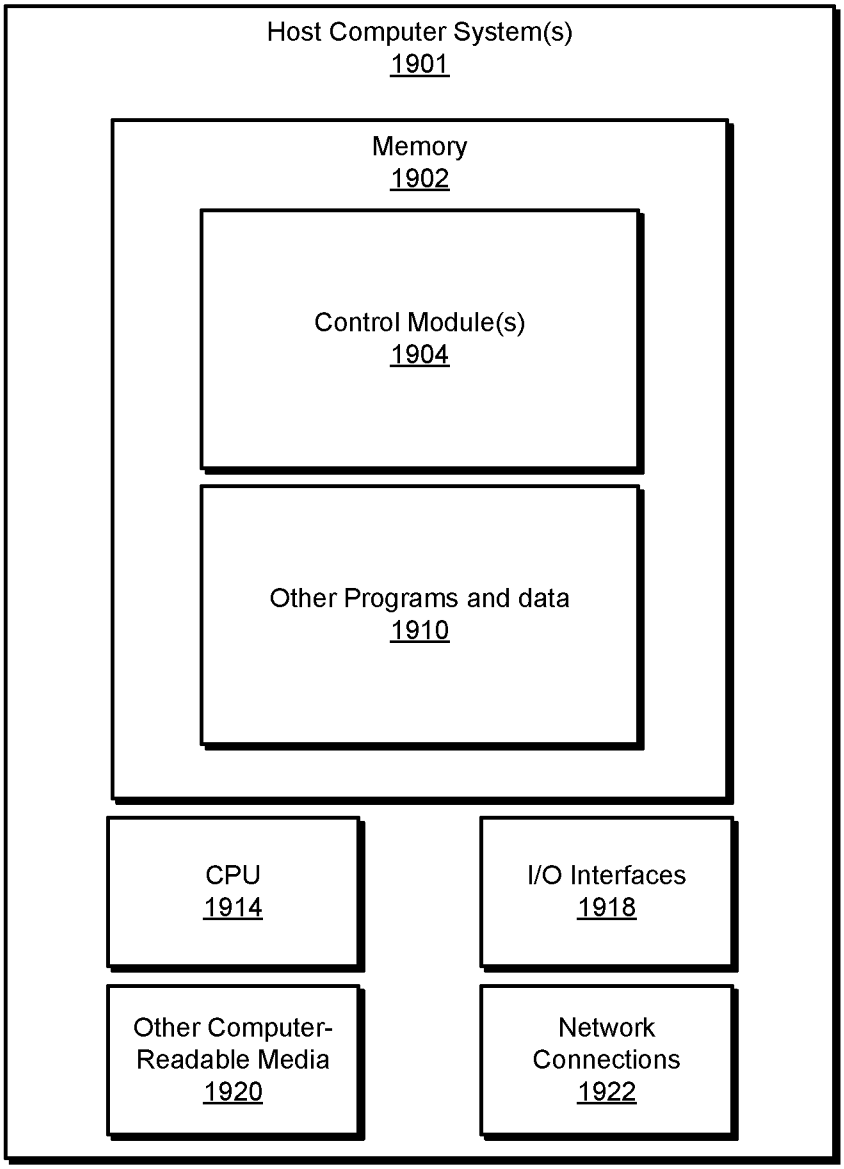
FIG. 19 shows a diagram of an example computing system that may facilitate the performance of one or more of the methods described herein.

FIG. 19 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 19 illustrates an example of underlying hardware on which such software and functionality may be hosted and/or implemented.

In particular, shown is example host computer system(s) 1901. For example, such computer system(s) 1901 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1901 may include memory 1902, one or more central processing units (CPUs) 1914, I/O interfaces 1918, other computer-readable media 1920, and network connections 1922.

Memory 1902 may include one or more various types of non-volatile and/or volatile storage technologies. Examples of memory 1902 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1902 may be utilized to store information, including computer-readable instructions that are utilized by CPU 1914 to perform actions, including those of embodiments described herein.

Memory 1902 may have stored thereon control module(s) 1904. The control module(s) 1904 may be configured to implement and/or perform some or all of the functions of the systems or components described herein. Memory 1902 may also store other programs and data 1910, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1922 are configured to communicate with other computing devices to facilitate the functionality described herein. In various embodiments, the network connections 1922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1918 may include a video interface, other data input or output interfaces, or the like. Other computer-readable media 1920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

initiating a cellular field testing tool that tests a condition of cellular network connectivity of a device under test;

collecting logs of raw data from the cellular field testing tool based on the cellular field testing tool testing the condition of cellular network connectivity of the device under test; and applying autonomously, by the cellular field testing tool, an intelligent testing policy for a specific network condition test to the logs of raw data to output a binary decision of whether the specific network condition test passed or failed:

wherein:

the intelligent testing policy specifies criteria for determining whether the specific network condition test passed or failed;

the criteria are provided by a cellular network carrier that uses the cellular field testing tool to test performance of a cellular service network that the cellular network carrier operates; and the criteria specify that at least three failed runs of the specific network condition test result in the binary decision indicating that the specific network condition test failed.

2. The method of claim 1, wherein the intelligent testing policy enhances a version of the cellular field testing tool that otherwise was limited to collecting raw data without analyzing that raw data.

3. The method of claim 1, wherein the raw data comprises an indication of a number of call drops or a number of call setup failures.

4. The method of claim 3, wherein outputting the binary decision of whether the specific network condition test passed or failed is based at least in part on the number of call drops or the number of call setup failures.

5. The method of claim 1, wherein a failure to satisfy preconditions for executing the specific network condition test results in the binary decision indicating that the specific network condition test failed.

6. The method of claim 1, wherein the device under test comprises a smartphone.

7. A non-transitory computer-readable medium encoding instructions that, when executed by at least one physical processor of a computing device, cause the computing device to perform operations comprising:

initiating a cellular field testing tool that tests a condition of cellular network connectivity of a device under test;

collecting logs of raw data from the cellular field testing tool based on the cellular field testing tool testing the condition of cellular network connectivity of the device under test; and applying autonomously, by the cellular field testing tool, an intelligent testing policy for a specific network condition test to the logs of raw data to output a binary decision of whether the specific network condition test passed or failed;

wherein:

the intelligent testing policy specifies criteria for determining whether the specific network condition test passed or failed;

the criteria are provided by a cellular network carrier that uses the cellular field testing tool to test performance of a cellular service network that the cellular network carrier operates; and the criteria specify that at least three failed runs of the specific network condition test result in the binary decision indicating that the specific network condition test failed.

8. The non-transitory computer-readable medium of claim 7, wherein the intelligent testing policy enhances a version of the cellular field testing tool that otherwise was limited to collecting raw data without analyzing that raw data.

9. The non-transitory computer-readable medium of claim 7, wherein the raw data comprises an indication of a number of call drops or a number of call setup failures.

10. The non-transitory computer-readable medium of claim 9, wherein outputting the binary decision of whether the specific network condition test passed or failed is based at least in part on the number of call drops or the number of call setup failures.

11. The non-transitory computer-readable medium of claim 7, wherein a failure to satisfy preconditions for executing the specific network condition test results in the binary decision indicating that the specific network condition test failed.

12. The non-transitory computer-readable medium of claim 7, wherein the device under test comprises a smartphone.

* * * * *